(12) United States Patent
Miyamoto et al.

(10) Patent No.: US 6,225,712 B1
(45) Date of Patent: May 1, 2001

(54) VOICE COIL MOTOR

(75) Inventors: Makoto Miyamoto, Sanda; Hideki Kuwajima, Kyoto; Kenichi Sakamoto, Toyonaka; Hiromi Kita, Kashihara; Kaoru Matsuoka, Osaka, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/447,736

(22) Filed: Nov. 23, 1999

(30) Foreign Application Priority Data

Nov. 24, 1998 (JP) .................................................. 10-331816
May 18, 1999 (JP) .................................................. 11-136489

(51) Int. Cl.$^7$ .................................................. H02K 33/00
(52) U.S. Cl. .................................. 310/15; 310/12; 310/13; 360/104
(58) Field of Search .................................. 310/12, 13, 15, 310/17, 206, 208, 180; 360/104, 105, 106, 78.13

(56) References Cited

U.S. PATENT DOCUMENTS

| | | | |
|---|---|---|---|
| 5,587,852 | * 12/1996 | Yoshiura et al. | 360/78.12 |
| 5,793,133 | * 8/1998 | Shiraki et al. | 310/81 |
| 5,973,421 | * 10/1999 | Iwabuchi | 310/13 |
| 6,064,121 | * 5/2000 | Shervington et al. | 290/1 A |

* cited by examiner

Primary Examiner—Nestor Ramirez
Assistant Examiner—Thanh Lam
(74) Attorney, Agent, or Firm—Parkhurst & Wendel, L.L.P.

(57) ABSTRACT

A voice coil motor capable of quickly and precisely positioning a magnetic head with high precision is provided with a bearing rotatably supporting a head carriage without being influenced by a radial load. Two coils having radial sections contributing to generate a torque are provided to be rotatable in a magnetic space formed by a permanent magnet and a pair of yokes, and are layered along a central rotating axis in such a manner that an extension angle of the radial sections of one coil differs in direction from that of the radial sections of the other coil. When electric current flows, no radial load works, and a resultant force generated in these coils can be a couple of forces in the direction vertical to the movement direction of the magnetic head, so that the magnetic head can be quickly positioned with high precision, realizing a small magnetic disk device.

11 Claims, 21 Drawing Sheets

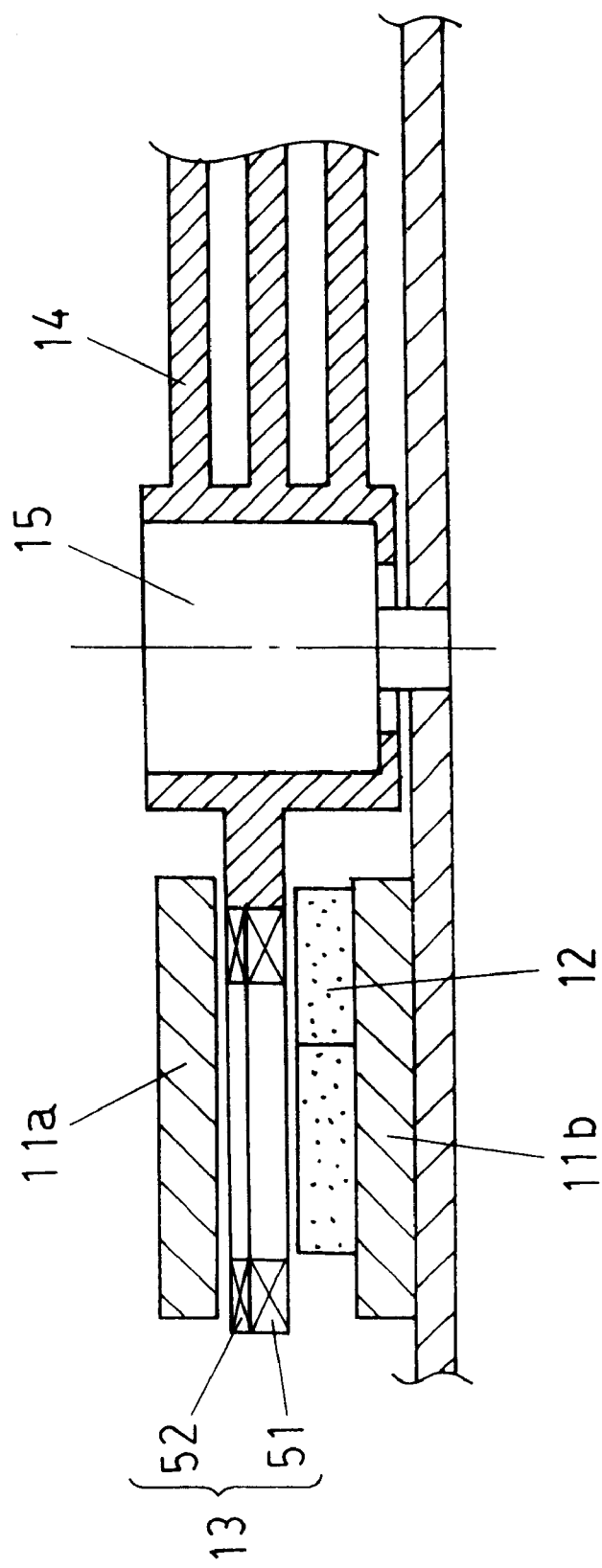

VOICE COIL MOTOR

FIELD OF THE INVENTION

The present invention relates to a voice coil motor used in positioning a magnetic head of a magnetic disk device.

BACKGROUND OF THE INVENTION

In a magnetic disk device, a voice coil motor has been conventionally used to position a magnetic head at a predetermined track. Recently, with the progress of a small and high-performance computer, there has been an increasing demand for a smaller magnetic disk device of a larger capacity and higher access. To satisfy the demand, the technology of high density track, and high-speed and high precision positioning is required, and requirements of the voice coil motor have become higher.

FIG. 25 shows a conventional voice coil motor.

The conventional voice coil motor includes a pair of yokes 1 arranged opposite to each other, a permanent magnet 2 fixed to at least one of the yokes 1, a fan-shaped movable coil 3 formed in a magnetic space defined between the yoke 1 and the permanent magnet 2 and being rotatable around a bearing 5, and a head carriage 4 coupled to the movable coil 3.

When a predetermined driving current flows through the fan-shaped movable coil 3, driving force is generated in the movable coil 3 according to the Fleming's left-hand rule, and the movable coil 3 rotates along an arrow A around the bearing 5, thereby rotating the head carriage 4 around the bearing 5 along an arrow B. As a result, a magnetic head 6 provided at the end of the head carriage 4 is moved opposite the rotation of the movable coil, thus being positioned.

However, the conventional voice coil motor has the problem that the positioning precision is lowered by the vibration of the head carriage 4 when the magnetic head is positioned by high-speed drive, thereby interfering with the high-density recording process on the magnetic disk device.

This problem will be described below in detail by referring to FIG. 26.

When an electric current flows through the fan-shaped movable coil 3, the driving force F is generated in the radial sections of the movable coil 3 by the magnetic field of the magnetic circuit formed by the permanent magnet 2 and the yoke 1. The resultant force generates a torque T around the bearing 5, and the electric current of the movable coil 3 can be controlled, thereby positioning the magnetic head 6.

At this time, a radial load of about 2F is applied to the bearing 5 with the torque T. When the flow of the current becomes opposite quickly in the movable coil 3 for high-speed drive, the direction of the radial load applied to the bearing 5 changes correspondingly, and therefore, the head carriage 4 vibrates along the arrow D.

Since the direction of the radial load applied to the bearing 5 is almost parallel to the direction C of the movement when the magnetic head 6 is positioned, the vibration of the head carriage 4 generated by the radial load deteriorates the positioning precision of the magnetic head 6. This lowers the tracking precision in a shorter track, thereby interfering with the improvement in recording density.

In a magnetic disk device, it is necessary to quickly position the magnetic head 6 with high precision. However, when the conventional voice coil motor is used, the vibration of the head carriage 4 lowers the positioning precision when the magnetic head 6 is positioned in high-speed drive. This interferes with a higher-density record on the magnetic disk device.

This phenomenon will be described below in detail by referring to FIG. 25. When an electric current flows through the movable coil 3, the magnetic field of the magnetic circuit formed by the permanent magnet 2 and the yoke 1 generates the driving force F in the radial sections of the movable coil 3. The resultant force generates the torque T around the bearing 5, and the electric current in the movable coil 3 is appropriately controlled, thereby positioning the magnetic head 6. At this time, the radial load of about 2F is applied to the bearing 5 with the torque T. When the direction of the flow of the electric current through the movable coil 3 is quickly switched for high-speed drive, the direction of the radial load applied to the bearing 5 changes correspondingly. As a result, the head carriage 4 vibrates along the arrow D. Since the direction of the radial load 2F applied to the bearing 5 is almost parallel to the movement direction C when the magnetic head 6 is positioned, the vibration of the head carriage 4 generated by the radial load 2F lowers the positioning precision of the magnetic head 6.

The present invention has been developed to solve the above-described problems, and aims at providing a swing-type voice coil motor capable of quickly positioning a rotating member with high precision without applying a radial load to a unit such as a bearing supporting a freely rotating member or the like when moving a rotating member such as a head carriage supporting a magnetic head or the like.

SUMMARY OF THE INVENTION

To attain the above-described object, the voice coil motor according to the present invention has a configuration in which there are a plurality of coils whose radial sections extend at angles different in direction, and the resultant force generated in the coils is only a couple along the rotation without generating a radial load causing the vibration.

Furthermore, the plurality of coils are different in size, and the device can be small and thin with the thickness along the axis of the coil smaller by arranging a smaller coil in a larger hollow coil.

In addition, the voice coil motor according to the present invention has a configuration in which there are a plurality of coils whose radial sections extend in different directions, and includes a switch for selectively switching the combination of directions in which current flows, thereby allowing a quicker movement of a head carriage.

Furthermore, in the voice coil motor of the present invention, the plurality of layered coils are of a same shape, and the sides of coil layers from which leader line elements are led face the same direction.

According to the configuration, the layered coils are of a same shape, including the configuration of leader line elements. That is, since there is only one specification of the coil, the productivity can be improved and cost reduction can be achieved.

The voice coil motor according to the present invention also includes first and second hollow coils whose radial sections extend in different directions. The shortest distance from the rotation center to the second hollow coil is set shorter than the shortest distance from the rotation center to the first hollow coil. Thus, although the first and the second hollow coils are not of a same shape, their performance can be improved.

In the voice coil motor according to the present invention, the first and the second hollow coils differ in thickness, have substantially a same shape since the first and the second hollow coils are concentrically formed at least in part, and improve the performance.

Furthermore, in the voice coil motor according to the present invention, a predetermined area of at least one of the first and the second layered coils is compressed along the axis for plasticization, or the material of a coil is appropriately selected to make the total thickness of the layers thinner or to improve processability.

DISCLOSURE OF THE INVENTION

The voice coil motor according to the present invention comprises a pair of yokes opposite to each other having a predetermined space defined between the yokes; a permanent magnet fixed to at least one of the yokes in the space between the yokes; and a plurality of coils mounted on a rotating member which is rotatable around a predetermined rotating axis, and provided in a magnetic space formed by the permanent magnet and the yokes, said plurality of coils having radial sections contributing to generating a torque. With this configuration, the voice coil motor has the plurality of coils layered one on top of the other along the central rotating axis with the radial sections extending in different directions so that the resultant force of the radial sections of the plurality of coils can be a couple of forces in the direction vertical to the movement direction of the rotating member when an electric current flows in a predetermined direction through each coil.

According to the above-described configuration, if an electric current flows in a predetermined direction through a coil when a rotating member such as a head carriage supporting a magnetic head is moved, then a couple of forces is generated in the direction vertical to the movement direction of the rotating member. As a result, a radial load is not applied to a unit such as a bearing rotatably supporting a rotating member, thereby generating no vibration in the unit. Therefore, the rotating member can be stably rotated. For example, when a magnetic head is mounted to the end of a rotating member, the magnetic head can be quickly positioned with high precision. In addition, when the voice coil motor is applied to a magnetic disk device, the area occupied by the coils in the magnetic disk device is not large, and therefore, the factor to prevent miniaturization of the magnetic disk device can be eliminated.

Furthermore, the voice coil motor according to the present invention includes a pair of yokes opposite to each other having a predetermined space defined between the yokes; a permanent magnet fixed to at least one of the yokes in the space between the yokes; and a plurality of coils mounted on a rotating member which is rotatable around a predetermined rotating axis, and provided in a magnetic space formed by the permanent magnet and the yokes, said plurality of coils having radial sections contributing to generating a torque. According to the configuration, the voice coil motor has the plurality of coils having the radial sections extending at different extension angles in different directions so that the resultant force of the radial sections of the plurality of coils can be a couple of forces in the direction vertical to the movement direction of the rotating member when an electric current flows in a predetermined direction through each coil. The plurality of coils are different from one another in size, and at least a coil larger than any other coil has a hollow portion and a smaller coil is accommodated in the hollow portion of the coil having a larger hollow.

According to the above-described configuration, if an electric current flows in a predetermined direction through a coil when a rotating member such as a head carriage supporting a magnetic head is moved, then a couple of forces is generated in the direction vertical to the movement direction of the rotating member. As a result, a radial load is not applied to a unit such as a bearing freely supporting a rotating member, thereby generating no vibration in the unit. Therefore, the rotating member can be stably rotated. For example, when a magnetic head is mounted to the end of a rotating member, the magnetic head can be quickly positioned with high precision. In addition, when the voice coil motor is applied to a magnetic disk device, the area occupied by the coils in the magnetic disk device is not large, and the thickness along the coil axis is not increased, thereby realizing a small and thin magnetic disk device.

Furthermore, the voice coil motor according to the present invention includes a pair of yokes opposite to each other having a predetermined space defined between the yokes; a permanent magnet fixed to at least one of the yokes in the space between the yokes; and a plurality of coils mounted on a rotating member which is rotatable around a predetermined rotating axis, and provided in a magnetic space formed by the permanent magnet and the yokes, said plurality of coils having radial sections contributing to generating a torque. According to the configuration, the voice coil motor has the plurality of coils having the radial sections extending at different extension angles in different directions so that a current flow direction switch for selectively switching the combination of directions in which an electric current flows through the plurality of coils can be connected to at least one coil.

According to the configuration, if an electric current flows in a predetermined direction through a coil when a rotating member such as a head carriage supporting a magnetic head is moved, then a couple of forces is generated in the direction vertical to the movement direction of the rotating member. As a result, a radial load is not applied to a unit such as a bearing rotatably supporting a rotating member, so that no vibration is generated in the unit, and the magnetic head is positioned with high precision by generating a couple of forces in the direction vertical to the movement direction of the rotating member. In addition, the head carriage as a rotating member can be moved quickly by changing the current flow direction through the coil by means of the current flow direction switch.

Furthermore, the voice coil motor according to the present invention includes a pair of yokes opposite to each other along a rotating support axis, with a space defined between the yokes; a permanent magnet fixed to at least one of the yokes in the space between the yokes; and a plurality of movable coils provided to be rotatable in a magnetic space formed by the permanent magnet and the yokes, and having radial sections contributing to generating a torque, said radial sections being arranged at different extension angles. With the configuration, the voice coil motor has movable coils which are layered one on top of the other along the axis and which are of a same shape.

According to the configuration, the production facilities (specification of a winding device, etc.) for producing each coil may be of a same type.

In addition, in the voice coil motor of the present invention, leader line elements are led out from a predetermined area in the radial sections, and the sides of the layered coils from which the leader line elements are led out face to each other.

According to the configuration, the production facilities (specification of a winding device, etc.) for producing each coil may be of a same type, and furthermore, the leader line element unit can be formed without increasing the thickness of the layered coils.

Furthermore, the voice coil motor according to the present invention includes a pair of yokes opposite to each other along a rotating support axis, with a space defined between the yokes; a permanent magnet fixed to at least one of the yokes in the space between the yokes; and a first and a second hollow coils layered one on top of the other along the axis to be rotatable in the magnetic space formed by the permanent magnet and the yokes. The radial sections contributing to generating a torque in the first hollow coil radially extend from the rotation center while the radial section contributing to generating a torque in the second hollow coil is designed to differ in extension angle from the radial sections of the first hollow coil. The shortest distance from the rotation center O to the second hollow coil is shorter than the shortest distance from the rotation center O to the first hollow coil.

According to the configuration, the amount of the magnetic fluxes interlinking at the line element sections for connecting the radial sections on the rotation center side of the second hollow coil can be reduced.

Furthermore, the voice coil motor according to the present invention includes a pair of yokes opposite to each other along a rotating support axis, with a predetermined space defined between the yokes; a permanent magnet fixed to at least one of the yokes in the space between the yokes; and a first and a second hollow coils layered one on top of the other along the axis to be rotatable in a magnetic space formed by the permanent magnet and the yokes. The radial sections contributing to generating a torque of the first hollow coil radially extends from the rotation center while the radial section contributing to generating a torque of the second hollow coil is designed to differ in extension angle from the radial sections of the first hollow coil. The thickness of the second hollow coil along the axis is smaller than the thickness of the first hollow coil along the axis.

According to the above-described configuration, the driving force generated in the first hollow coil is equal to that generated in the second hollow coil. The resultant force is a couple of forces only in the direction vertical to the movement direction of the magnetic head. That is, no vibratile force is generated to a bearing unit.

Furthermore, the voice coil motor according to the present invention includes a pair of yokes opposite to each other along a rotating support axis, with a predetermined space defined between the yokes; a permanent magnet fixed to at least one of the yokes in the space between the yokes; and a plurality of movable coils provided to be rotatable in a magnetic space formed by the permanent magnet and the yokes, and having radial sections contributing to generating a torque, said plurality of movable coils differing in extension angle. With the configuration, the voice coil motor has movable coils which are layered one on top of the other along the axis. In at least one of the movable coils, line element sections on the rotation center side for connecting the radial sections are formed concentric with the rotation center.

According to the configuration, the line element sections on the rotation center side connecting the radial sections in at least one of the movable coils are formed concentric with the rotation center, thus the movable coil can be provided closer to the rotation center.

In addition, the voice coil motor according to the present invention includes a pair of yokes opposite to each other along a rotating support axis, with a predetermined space defined between the yokes; a permanent magnet fixed to at least one of the yokes in the space between the yokes; and a plurality of movable coils being provided to be rotatable in a magnetic space formed by the permanent magnet and the yokes, having radial sections contributing to generating a torque, and differing in extension angle from one another. According to the configuration, the voice coil motor has movable coils which are layered one on top of the other along the axis. A predetermined area of at least one of the layered movable coils is compressed and plasticized along the rotating axis.

According to the configuration, the total thickness of the layers can be reduced in comparison with the total thickness of each coils combined.

The voice coil motor according to the present invention is made of a material containing aluminum, and can be easily plasticized.

Figure 16:
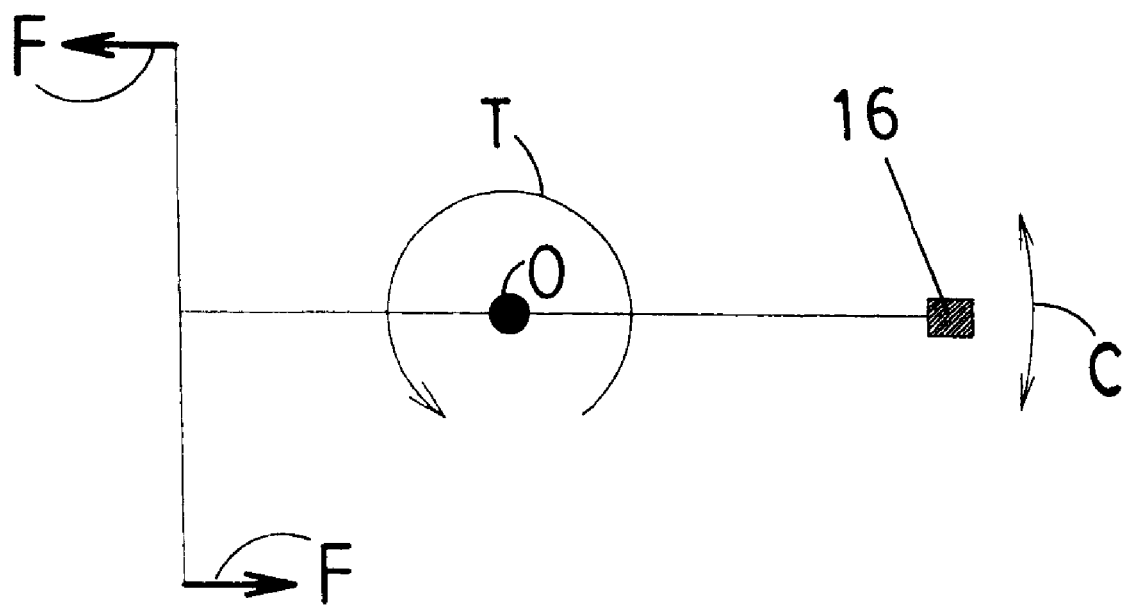
Figure 17:
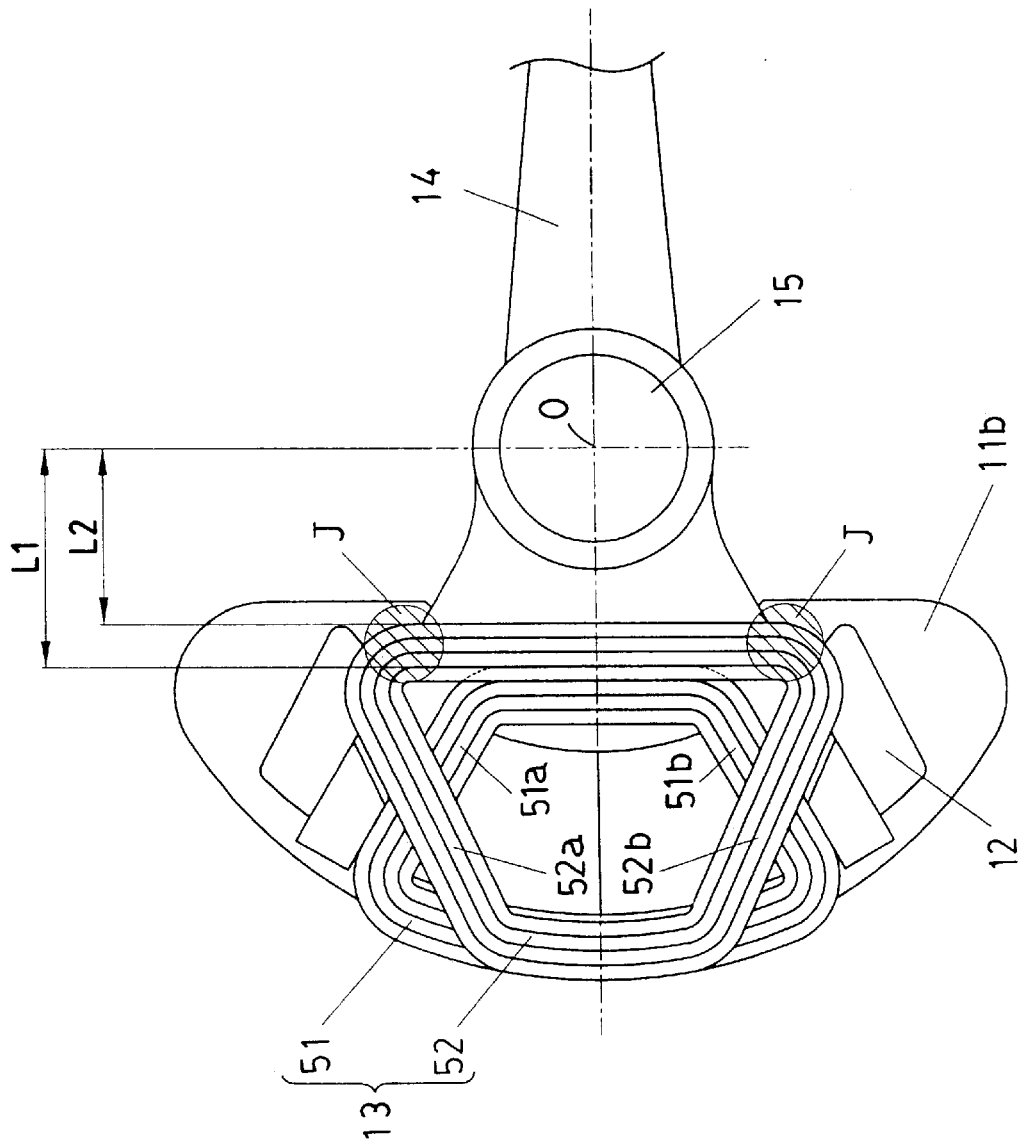
Figure 18:
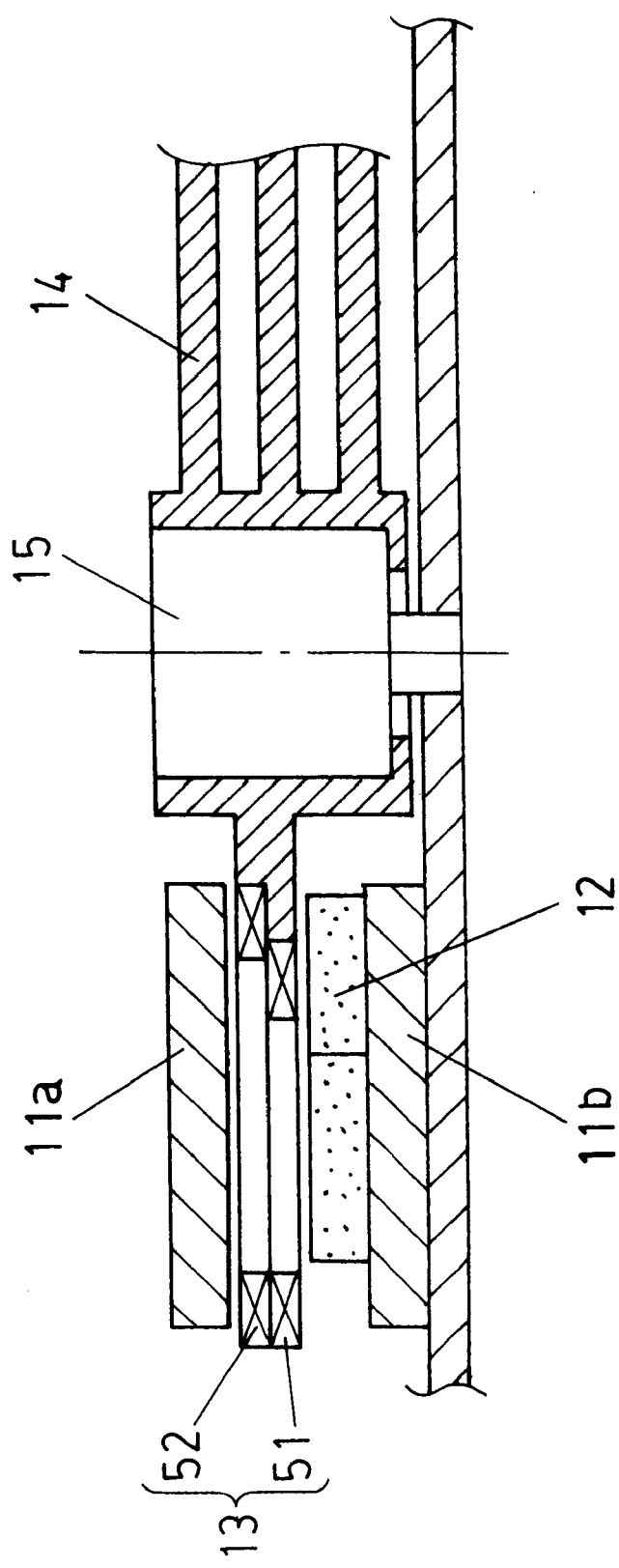
Figure 21:
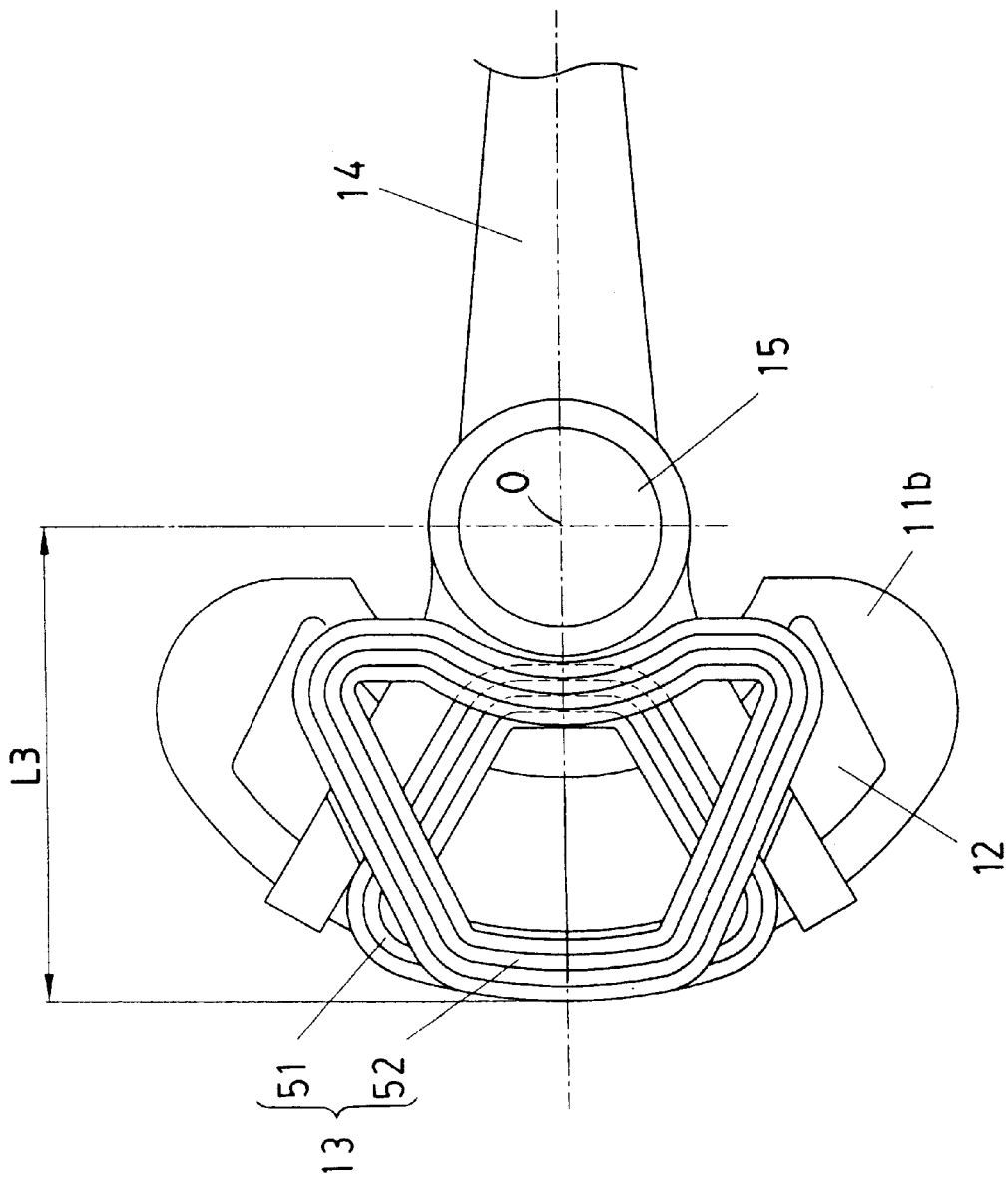
Figure 22:
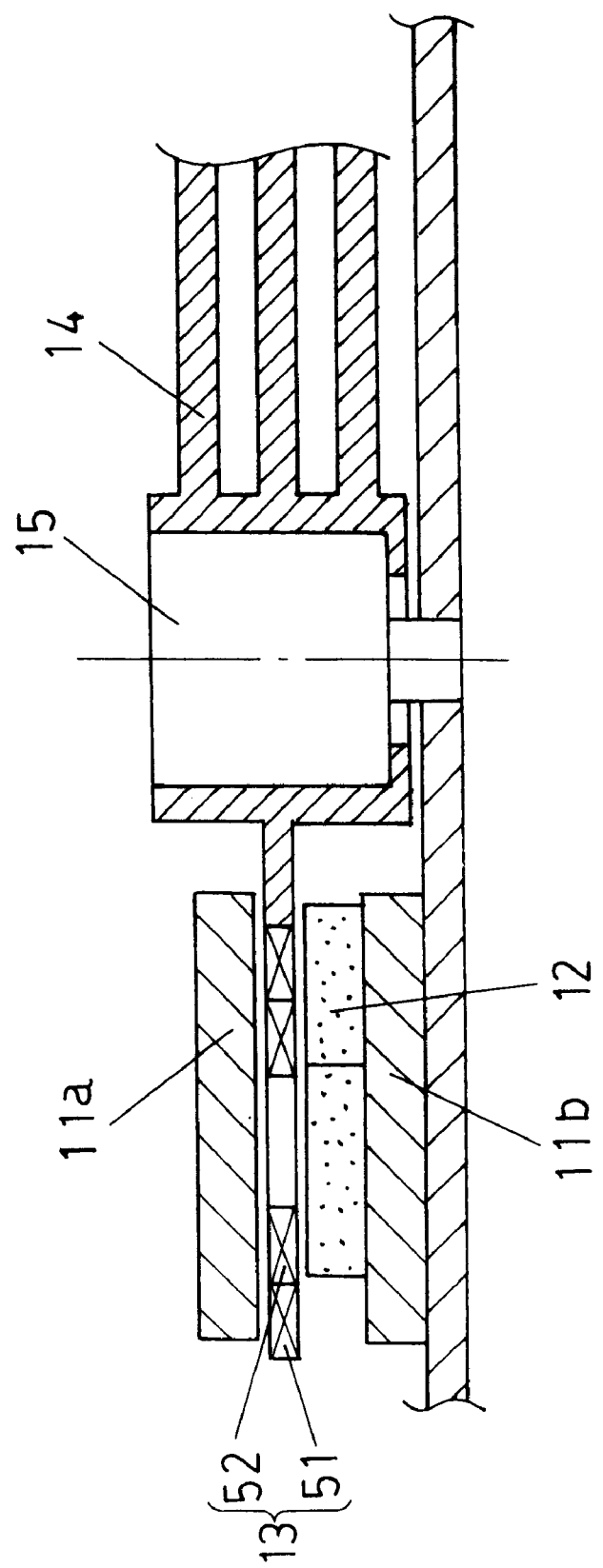
Figure 23:
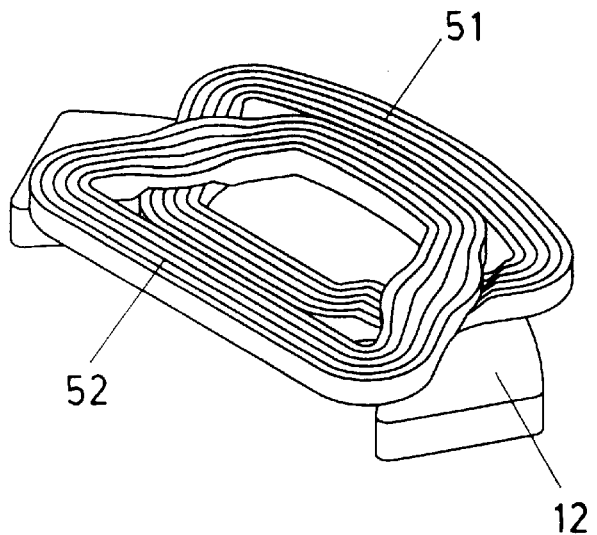
Figure 24:
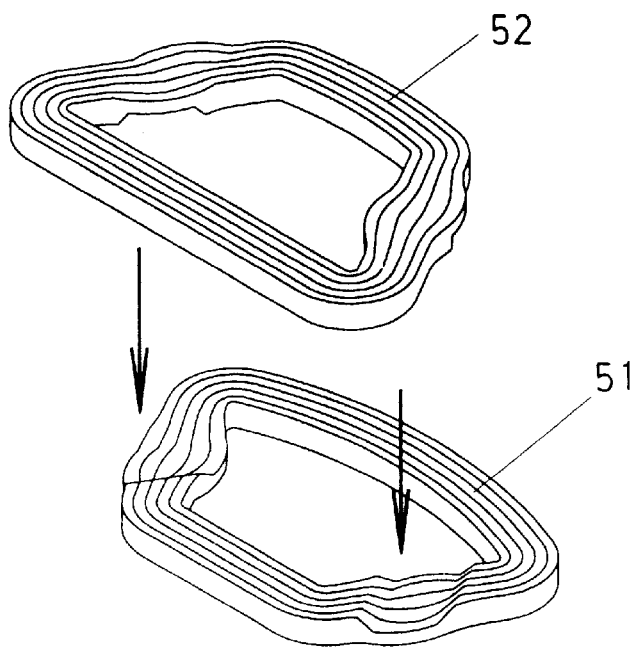
Figure 25:
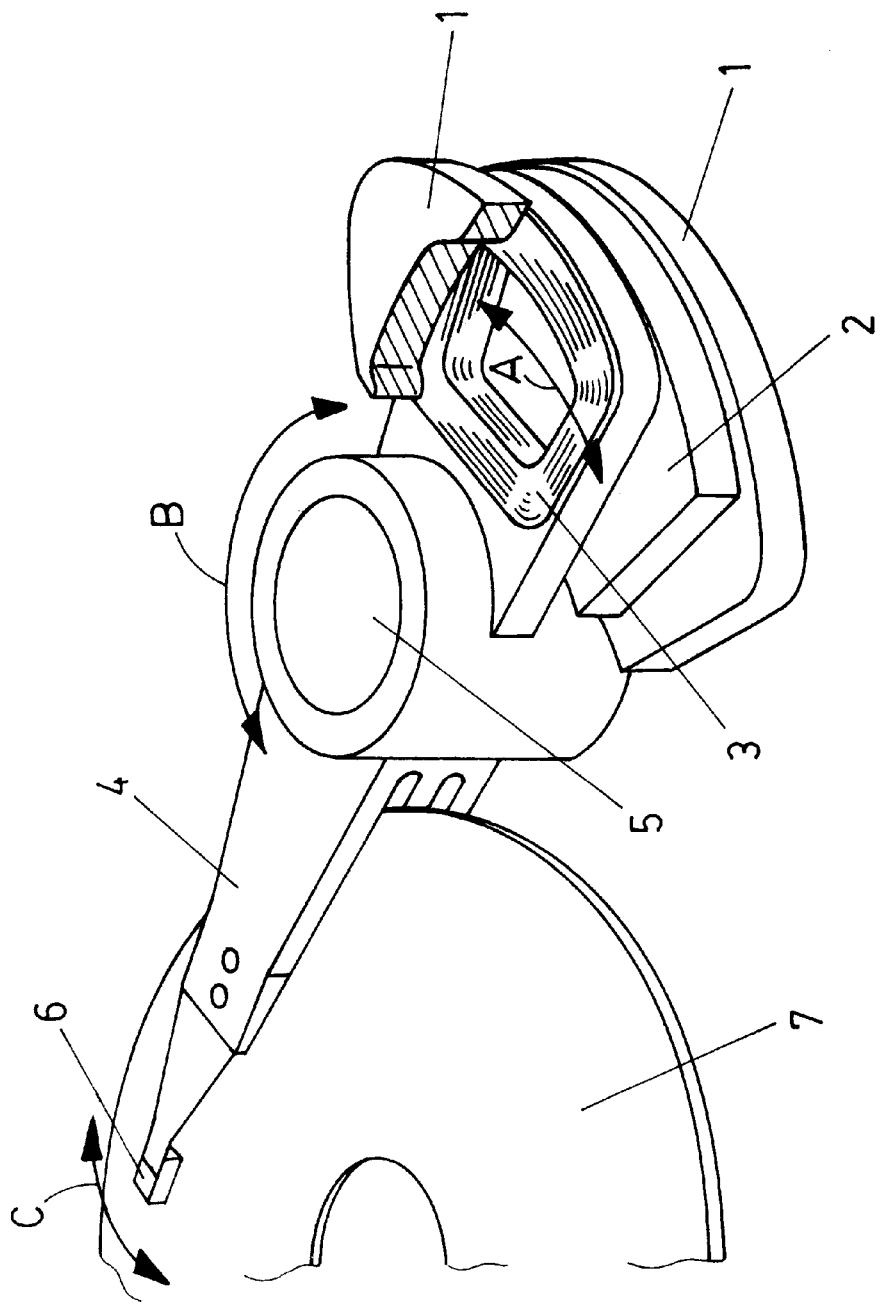
Figure 26:
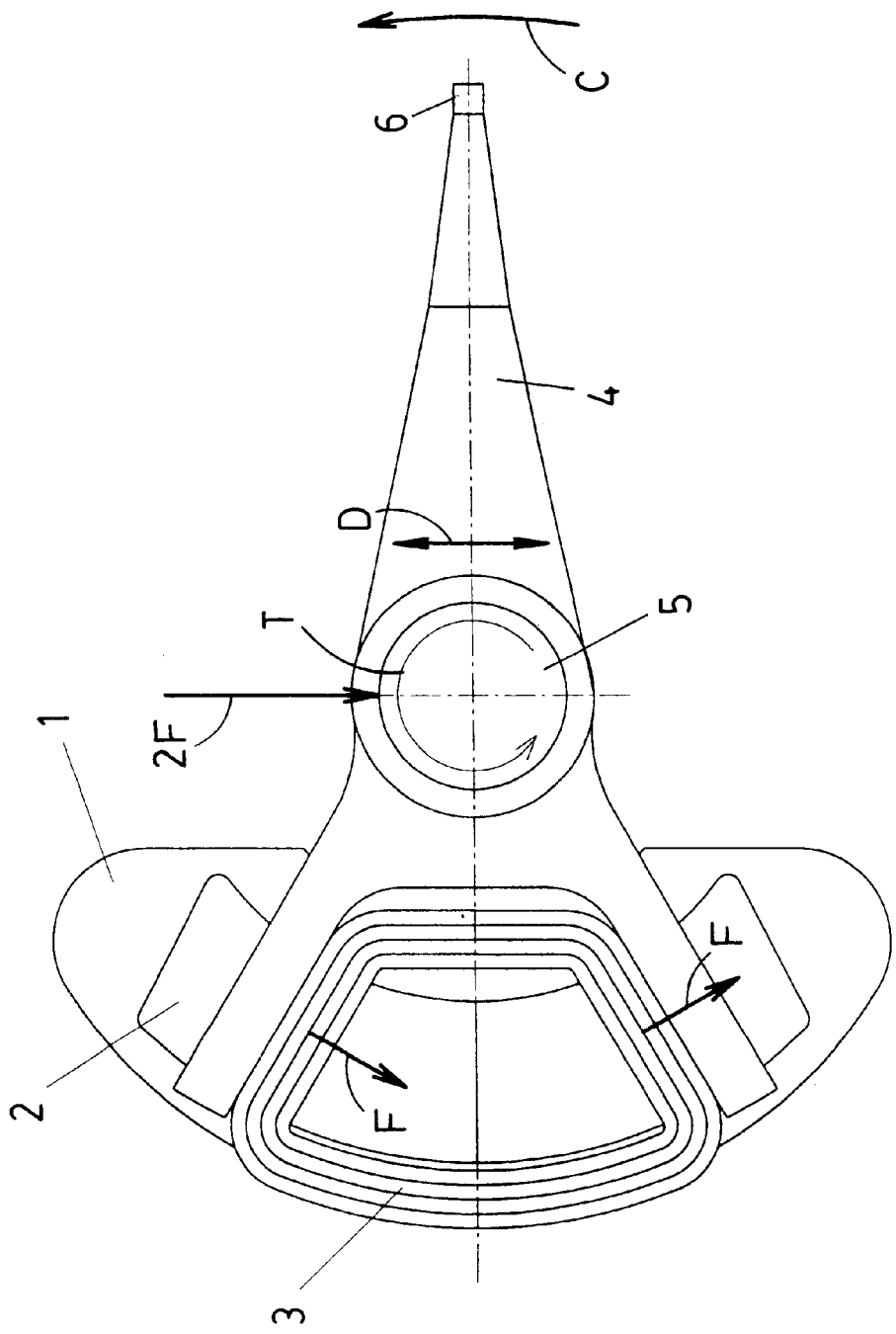
Figure 27B:
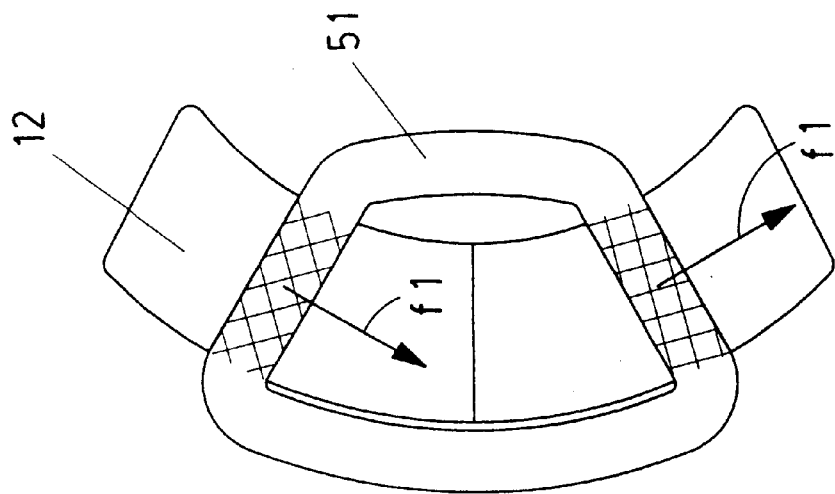
Figure 27A:
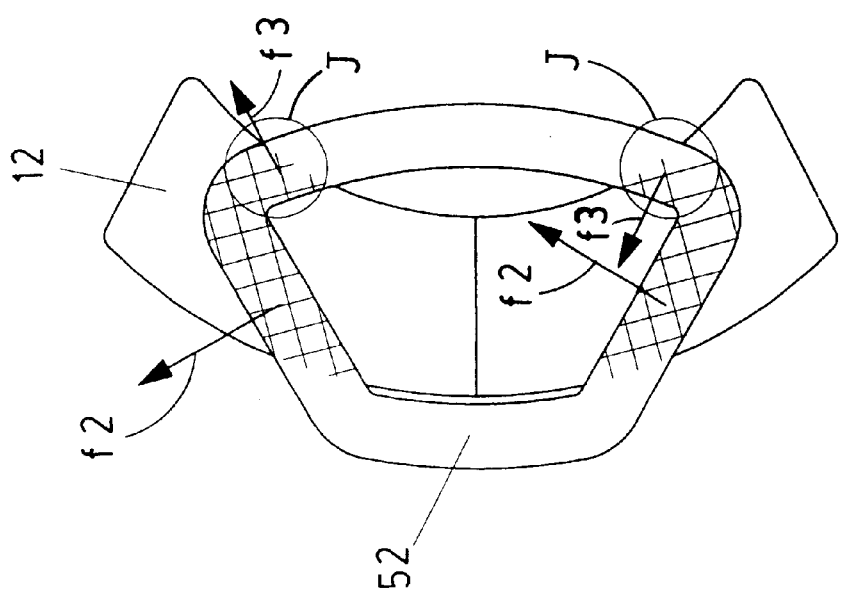

FIG. shows the operation of the voice coil motor according to the fourth embodiment of the present invention;

FIG. 16 is a typical view of the operation of the voice coil motor according to the fourth embodiment of the present invention;

FIG. 17 is a plan view of the voice coil motor according to a fifth embodiment of the present invention;

FIG. 18 is a sectional view of the voice coil motor according to the fifth embodiment of the present invention;

FIG. 19 is a sectional view of the voice coil motor according to a sixth embodiment of the present invention;

FIG. 20 shows the operation of the voice coil motor according to the sixth embodiment of the present invention;

FIG. 21 is a plan view of the voice coil motor according to a seventh embodiment of the present invention;

FIG. 22 is a sectional view of the voice coil motor according to an eighth embodiment of the present invention;

FIG. 23 is an oblique view of the coil according to the eighth embodiment of the present invention;

FIG. 24 is an oblique view showing the configuration of the coil according to the eighth embodiment of the present invention;

FIG. 25 is an oblique view of a conventional voice coil motor;

FIG. 26 shows an operation of the conventional voice coil motor;

FIG. 27 shows another operation of the conventional voice coil motor; and

Figure 28:
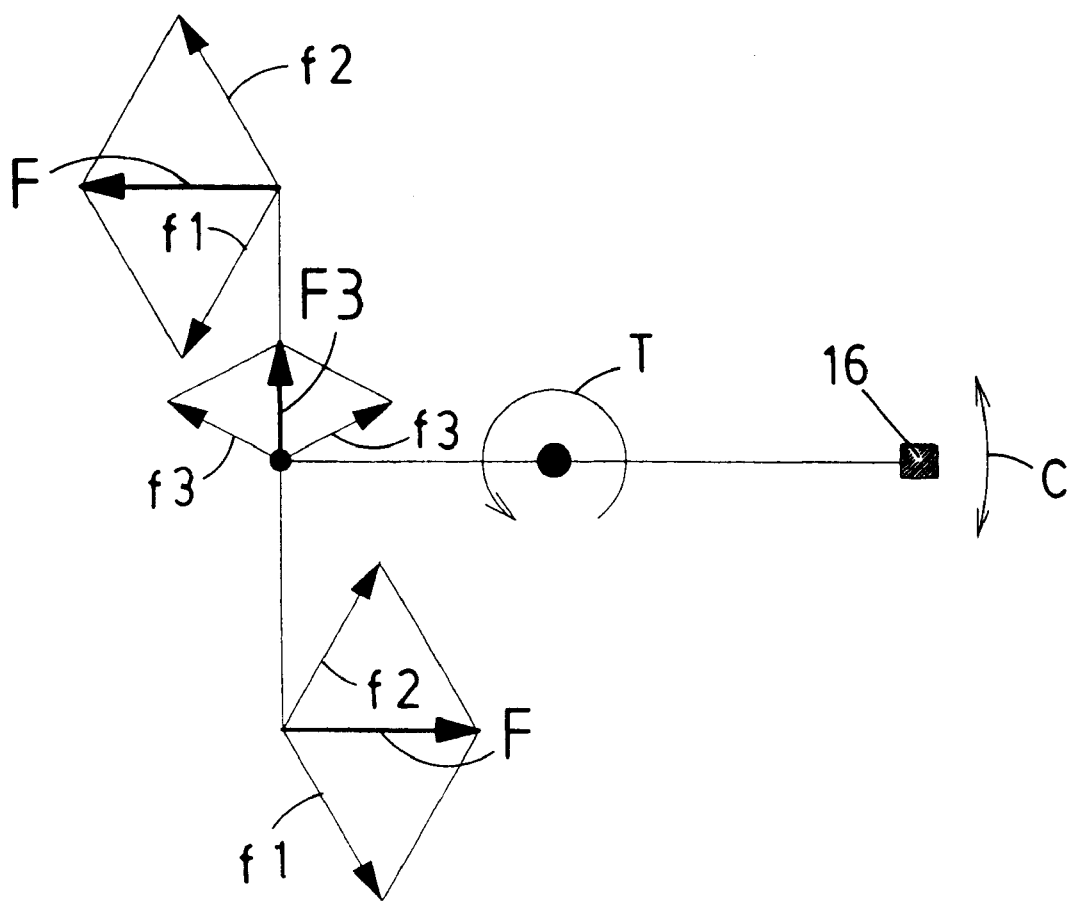

FIG. 28 is a typical view of the operation of the conventional voice coil motor.

DESCRIPTION OF PREFERRED EMBODIMENTS

The embodiments of the present invention will be described below in detail by referring to FIGS. 1 through 24.

Embodiment 1

Figure 1:
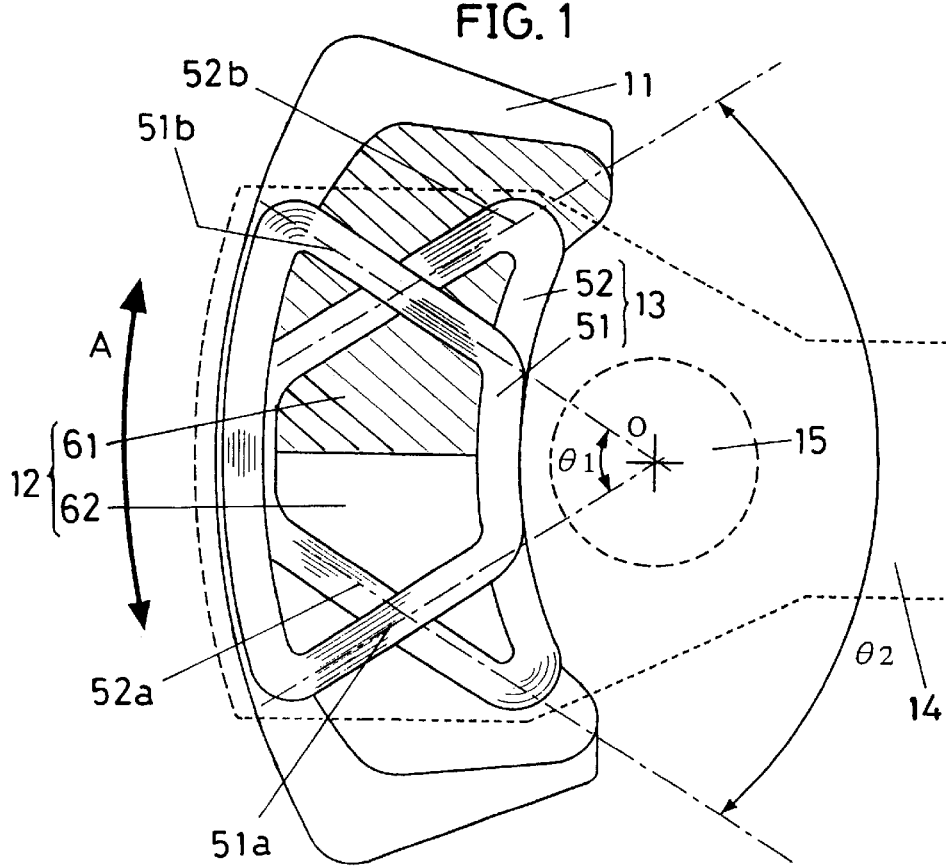
FIG. 1 is a plan view of the voice coil motor according to a first embodiment of the present invention.
Figure 2:
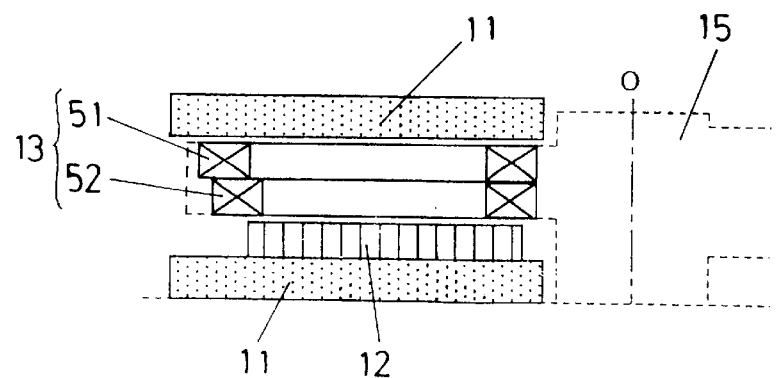
FIG. 2 is a sectional view of the voice coil motor according to the first embodiment of the present invention.

FIG. 1 is a plan view of a voice coil motor according to a first embodiment of the present invention. FIG. 2 is a sectional view of the voice coil motor. In FIGS. 1 and 2, broken lines denote an outlines of the head carriage 14 and the bearing 15 as rotating members.

As shown in FIGS. 1 and 2, a coil group 13 comprising two coils 51 and 52 is mounted to a head carriage 14 with the coils 51 and 52 layered along the axis of the bearing 15, and is held so that it rotates on the surface of a permanent magnet 12 (61 is an S pole, and 62 is a N pole) along an arrow A around a central rotating axis O of a bearing 15. The direction of an extension angle $\theta 1$ between two radial sections 51a and 51b generating the driving force of the coil 51 can be different from the direction of the extension angle $\theta 2$ between two radial sections 52a and 52b generating the driving force of the coil 52 (in this embodiment, the direction of extension angles are opposite from each other, and the coil 51 extends toward the central rotating axis O while the coil 52 extends in an opposite direction to the central rotating axis O). An electric current flows through the coils 51 and 52 in the direction denoted by the arrows i1 and i2 (refer to FIG. 3).

A pair of yokes 11 is mounted on the coil group 13 with a predetermined space between the yoke 11 and the coil group 13. The permanent magnet 12 is fixed to the surface on the coil 52 side of the lower yoke 11 to form a magnetic circuit. According to the present embodiment, the permanent magnet is mounted only on the lower yoke 11, but it is obvious that the permanent magnet can be mounted on the upper yoke 11. In addition, the permanent magnets can also be mounted on both yokes 11.

Figure 3:
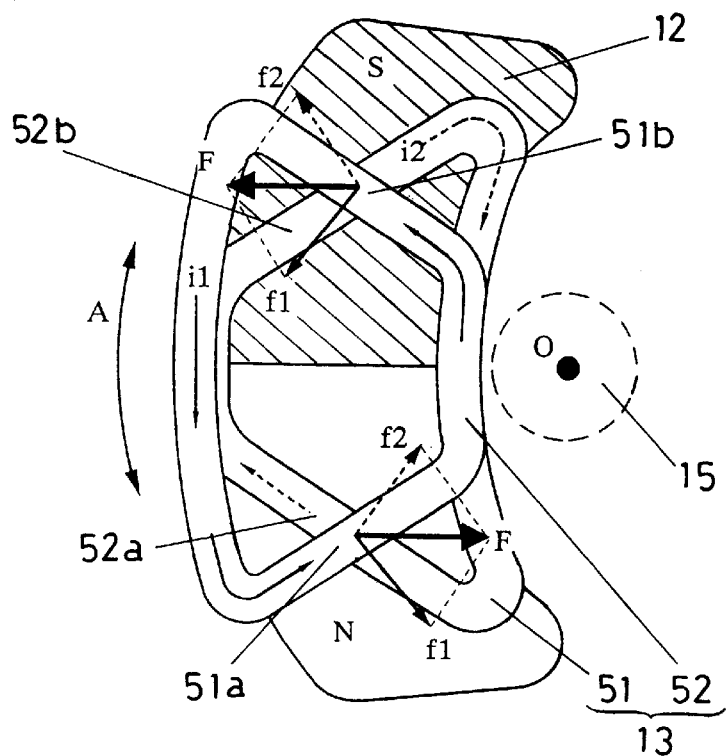
FIG. 3 shows the operation of the voice coil motor according to the first embodiment of the present invention.
Figure 4:
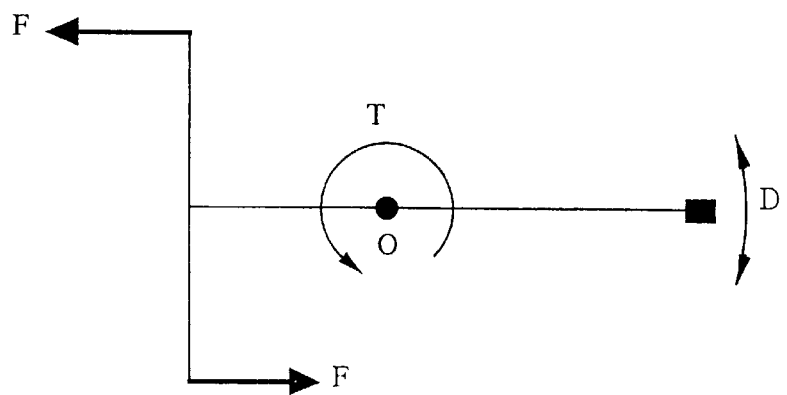
FIG. 4 is a typical view of the operation of the voice coil motor according to the first embodiment of the present invention.

The operation of the voice coil motor with the above-described configuration will be described below by referring to FIGS. 3 and 4. N and S shown in FIG. 3 respectively denote the magnetic poles of the permanent magnet 12. In FIG. 3, the arrows i1 and i2 respectively denote the directions of the electric currents flowing through the coils 51 and 52. Arrows f1 and f2 denote driving force generated in the coils 51 and 52 respectively. Arrow F denotes the resultant force of the f1 and f2, and O denotes a central rotating axis of the bearing 15. FIG. 4 is a typical view showing the entire operation, and an arrow T denotes the torque generated around the bearing 15.

When an electric current flows through the upper coil 51 in the arrow i1 direction, and through the lower coil 52 in the arrow i2 direction, the magnetic field generated by the magnetic circuit formed by the permanent magnet 12 and the yoke 11 produces driving force f1 in the radial sections 51a and 51b of the upper coil 51 in the arrow direction shown in FIG. 3, and driving force f2 in the radial sections 52a and 52b of the lower coil 52 in the arrow direction shown in FIG. 3. In the entire coil group 13, the force F, which is the resultant force of the driving force f1 and f2, is generated in the radial sections 51a, 51b, 52a, and 52b.

As shown in FIG. 4, the resultant force F generated in the radial sections 51a, 51b, 52a, and 52b of the coil group 13 functions as a couple of forces in the direction vertical to the movement direction D of a magnetic head 16 mounted to the end of the head carriage 14. Therefore, only the torque T, not a radial load, is generated around the rotation center O in the bearing 15. Accordingly, the head carriage 14 does not vibrate, thereby improving the positioning precision of the magnetic head 16.

According to the present embodiment, the two coils 51 and 52 having the radial sections 51a, 51b, 52a, and 52b are arranged such that the radial sections of each coils extend in opposite directions from each other and the resultant force F generated in the radial sections 51a, 51b, 52a, and 52b can be a couple of forces in the direction vertical to the movement direction of the magnetic head 16 supported by the head carriage 14 as a rotating member, thereby preventing the vibration of the head carriage 14 and positioning the magnetic head 16 with precision higher than the conventional voice coil motor.

In addition, since the two coils 51 and 52 are layered along the thickness (along the central rotating axis O), the area (as flatly viewed along the central rotating axis O) occupied by the coil group 13 in the magnetic disk device does not increase, thereby supporting the realization of a smaller system. That is, when coils are arranged side by side, there arises the problem that the area occupied by the coils increases. However, with the above-described configuration, the problem can be avoided.

In the above descriptions, two coils, that is, the upper coil 51 and the lower coil 52, are arranged. However, the number of coils is not limited to two, but three or four coils can be layered along the central rotating axis O (not shown in the attached drawings) such that the resultant force generated in the radial sections of these coils can be a couple of forces in the direction vertical to the movement direction of the head carriage 14 and the magnetic head 16. With this configuration, the area occupied by the coil group in the magnetic disk device does not increase, thereby supporting the realization of a smaller system.

Embodiment 2

Figure 5:
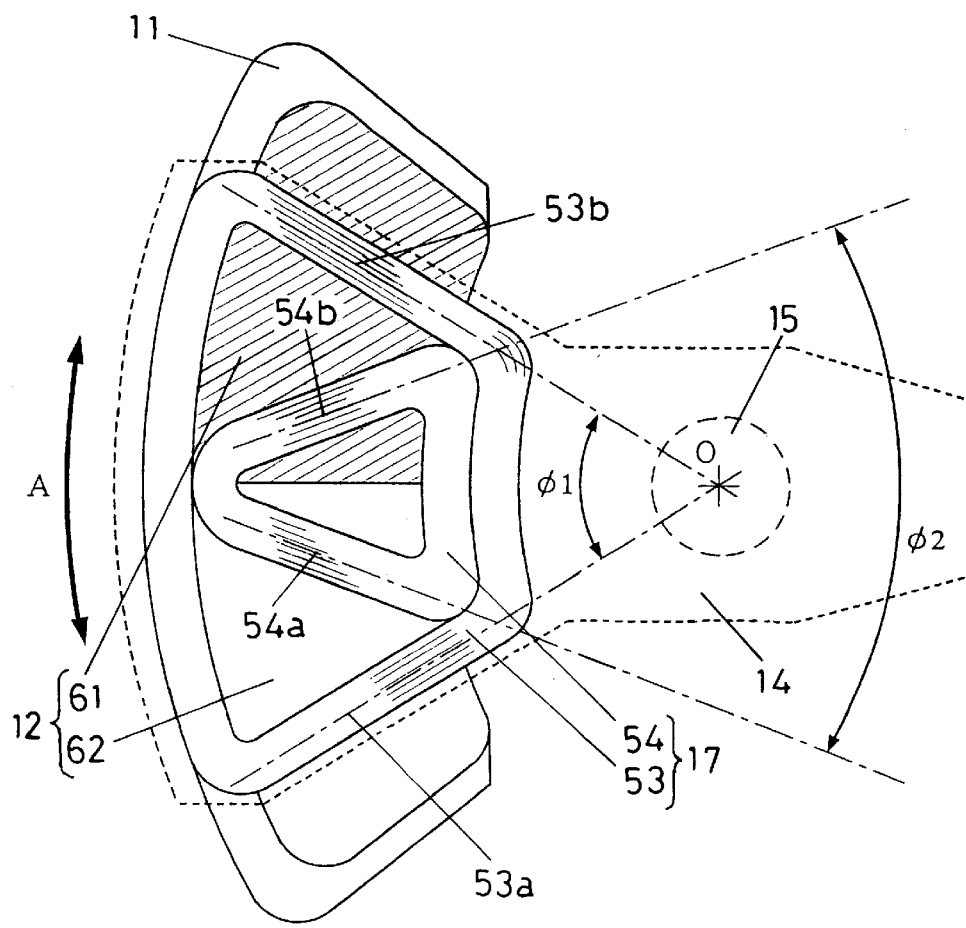
FIG. 5 is a plan view of the voice coil motor according to a second embodiment of the present invention.
Figure 6:
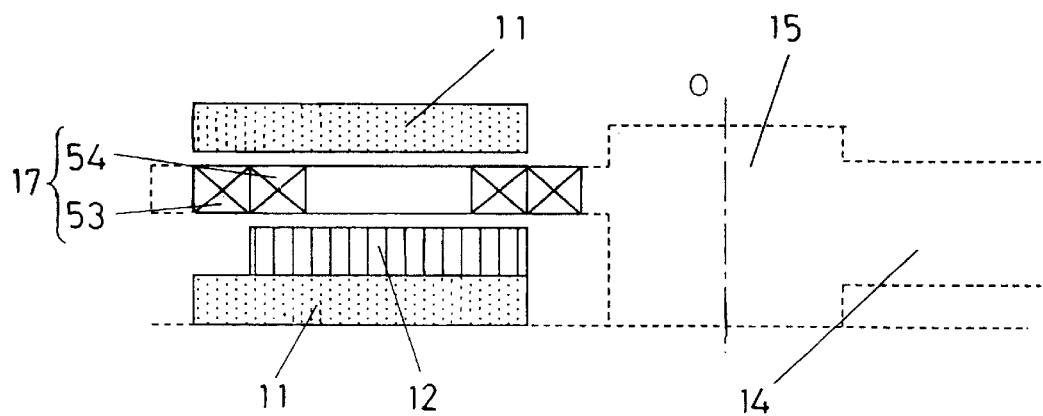
FIG. 6 is a sectional view of the voice coil motor according to the second embodiment of the present invention.

FIG. 5 is a plan view of the voice coil motor according to the second embodiment of the present invention. FIG. 6 is a sectional view of the voice coil motor. In FIGS. 5 and 6, the broken lines denote the outlines of the head carriage 14 and the bearing 15 as rotating members.

As shown in FIGS. 5 and 6, a coil group 17 is mounted to the head carriage 14, and is held such that it rotates on the surface of a permanent magnet 2 along the arrow A around the central rotating axis O of a bearing 15. The coil group 17 comprises a large hollow coil 53 and a small hollow coil 54. The small hollow coil 54 is arranged in the space in the large hollow coil 53. The direction of the extension angle $\phi 1$ made between two radial sections 53a and 53b generating the driving force of the large hollow coil 53 can be different from the direction of the extension angle φ2 made between two radial sections 54a and 54b generating the driving force of the small hollow coil 54 (in this embodiment, directions of extension angles are opposite from each other, and the large hollow coil 53 extends opposite from the central rotating axis O while the small hollow coil 54 extends toward the central rotating axis O). An electric current flows through the large hollow coil 53 and the small hollow coil 54 in the direction denoted by the arrows i1 and i2 (refer to FIG. 7).

A pair of yokes 11 are mounted on the coil group 17 with a predetermined space between the yoke 11 and the coil group 17. The permanent magnet 12 is fixed to the surface on the coil group 17 side of the lower yoke 11 to form a magnetic circuit. According to the present embodiment, the permanent magnet is mounted only on the lower yoke 11, but it is obvious that the permanent magnet can be mounted on the upper yoke 11. In addition, the permanent magnets can also be mounted on both yokes 11 without reducing the effect of the present invention.

Figure 7:
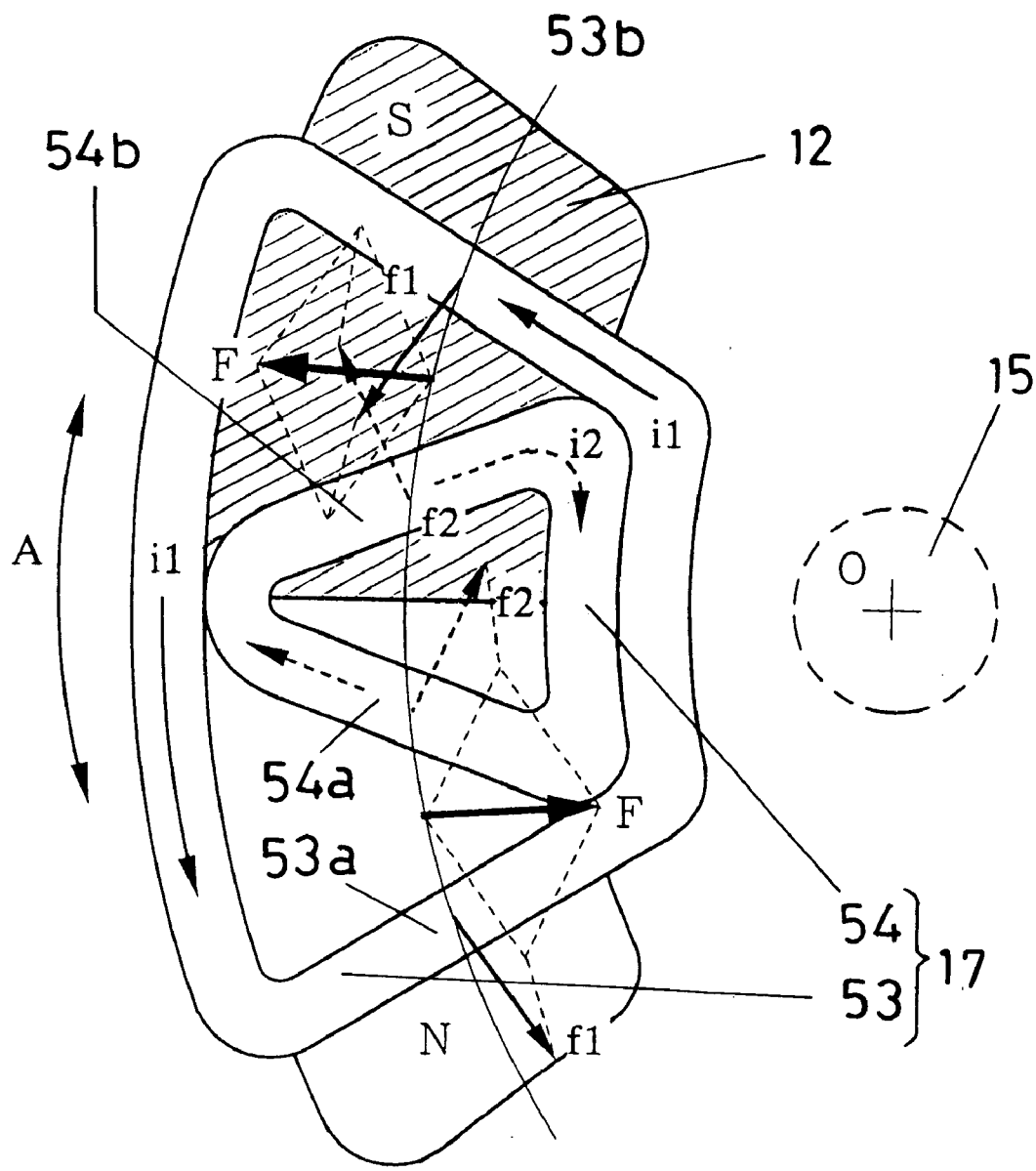
FIG. 7 shows the operation of the voice coil motor according to the second embodiment of the present invention.

The operation of the voice coil motor with the above-described configuration will be described below by referring to FIGS. 7 and 4. When an electric current flows through the large hollow coil 53 in the arrow i1 direction, and through the small hollow coil 54 in the arrow i2 direction, the driving force f1 is generated in the radial sections 53a and 53b of the large hollow coil 53 in the arrow direction shown in FIG. 7, and the driving force f2 in the radial sections 54a and 54b of the small hollow coil 54 in the arrow direction shown in FIG. 7. In the entire coil group 17, the force F, which is the resultant force of the driving force f1 and f2, is generated in the radial sections 53a, 53b, 54a, and 54b.

As shown in FIG. 4, the resultant force F generated in the radial sections 53a, 53b, 54a, and 54b of the coil group 17 functions as a couple of forces in the direction vertical to the movement direction D of a magnetic head 16 mounted to the end of the head carriage 14. Therefore, only the torque T, not a radial load, is generated around the rotation center O in the bearing 15. Accordingly, the head carriage 14 does not vibrate, thereby improving the positioning precision of the magnetic head 16.

According to the present embodiment, the large hollow coil 53 and the small hollow coil 54 having the radial sections 53a, 53b, 54a, and 54b are arranged such that the extensions are in opposite directions from each other and the resultant force F generated in the radial sections 53a, 53b, 54a, and 54b can be a couple of forces in the direction vertical to the movement direction of the magnetic head 16 supported by the head carriage 14 as a rotating member, thereby preventing the vibration of the head carriage 14 and positioning the magnetic head 16 with precision higher than the conventional voice coil motor.

In addition, since the small hollow coil 54 is arranged in the large hollow coil 53, the area occupied by the coil group 17 in the magnetic disk device does not increase, and the thickness of the coil group 17 does not increase along the axis, thereby supporting the realization of a smaller and thinner system. Furthermore, since the large hollow coil 53 and the small hollow coil 54 can be mounted without increasing the thickness of the coil group 17 along the axis, the space of the magnetic circuit formed by the permanent magnet 12 and the yokes 11 can be narrower with the reluctance (magnetic resistance) made smaller, and the magnetic fluxes interlinking the coil group 17 made larger, thereby increasing the torque generated in the coil group 17.

In the above descriptions, the small hollow coil 54 is arranged in the large hollow coil 53. A coil smaller than the small hollow coil 54 can be arranged in the small hollow coil 54. In this case, the smallest coil either can or cannot be hollow (not shown in the attached drawings).

Embodiment 3

FIGS. 8 through 11 show the operations of the voice coil motor according to another embodiment of the present invention.

Figure 8:
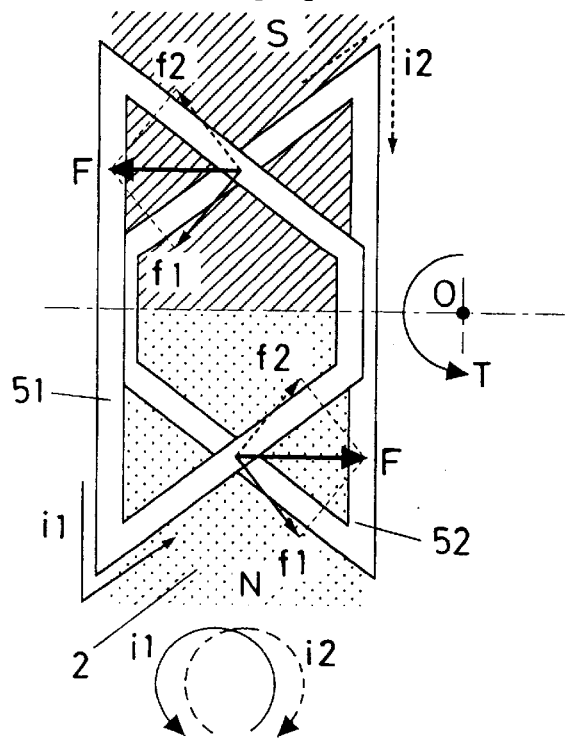
FIG. 8 shows an operation according to a third embodiment of the present invention.
Figure 9:
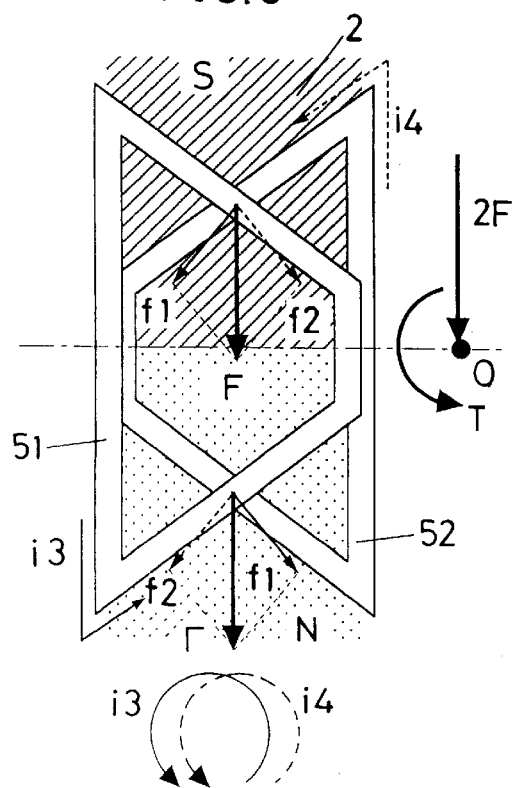
FIG. 9 shows another operation according to the third embodiment of the present invention.

In FIGS. 8 and 9, the coils 51 and 52 are layered along the rotating axis, and are different from each other in direction of the extension of the radial section contributing to generating a torque, and the coils layered along the rotating axis, the 12 is a permanent magnet. The above-described units are the same as those shown in FIGS. 1 and 2. The difference from those shown in FIGS. 1 through 3 is that a current flow switch (not shown in the attached drawings) for selectively switching the combination of current flow directions in the coils 51 and 52 is connected to this voice coil motor, and an electric current can flow through the two coils 51 and 52 in the same directions by setting the direction of the electric current flowing through the lower coil 52 opposite the direction shown in FIG. 8. That is, according to the present embodiment, the combination of the directions of the current flows through the coils shown in FIGS. 8 and 9 can be selectively switched by the current flow switch as necessary depending on an aspect of an operation.

The detailed explanation is as follows.

FIG. 8 shows the operations of the coils 51 and 52 when the head carriage 14 is being positioned. In FIG. 8, electric currents flow through the two coils 51 and 52 in the opposite directions i1 and i2. It is the operation shown in FIG. 3, and only the torque T is generated around the rotation center O at the bearing with no radial load generated. Since no radial load is generated at the bearing 15. Accordingly, the head carriage 14 does not vibrate, thereby the positioning precision for a magnetic head can be improved.

FIG. 9 shows the operations of the coils 51 and 52 performed during the seek of a head carriage. Electric currents flow through the two coils 51 and 52 in the same directions i3 and i4. The driving force F in the downward direction in FIG. 9 is generated in the radial sections of the coils 51 and 52, thereby obtaining a larger torque T than in the case in which electric currents flow through the coils 51 and 52 in opposite directions as shown in FIG. 8, and quickly moving a magnetic head.

Thus, since different operations having respective features can be realized by the current flow switch switching the combinations of the current flow directions through the coils 51 and 52, the switching operations are selectively performed such that each of the features of the operations can be utilized according to the present embodiment. That is, when a tracking operation is performed without a large torque with high positioning precision for a magnetic head required, the coils 51 and 52 are driven by the combination of the opposite current flow directions shown in FIG. 8. When only a quick movement of a magnetic head is demanded with a large torque required in case of seek operation, the coils 51 and 52 are driven respectively by the combination of the same current flow directions shown in FIG. 9.

With the configuration as shown in FIGS. 5 and 6, a similar effect as described above can be obtained by switching the combinations of the current flow directions through the large hollow coil 53 and the small hollow coil 54 by the current flow switch (not shown in the attached drawings).

This process will be described below by referring to FIGS. 10 and 11.

Figure 10:
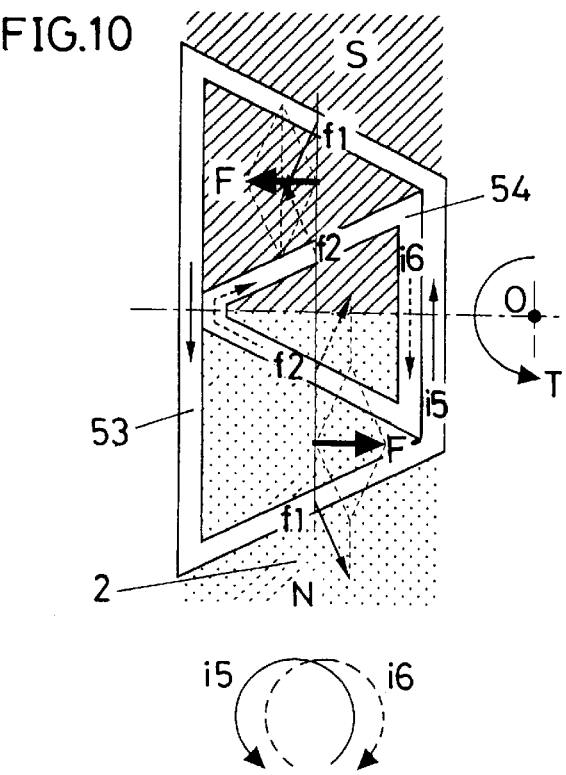
FIG. 10 shows a further operation according to the third embodiment of the present invention.

FIG. 10 shows the operations performed when electric currents flow in the opposite directions i5 and i6. Only a torque T is generated around the central rotating axis O at the bearing 15 with no radial load generated. Since no radial load is generated at the bearing 15, a head carriage does not vibrate, thereby positioning a magnetic head with high precision, and realizing the optimum voice coil motor for a tracking operation.

Figure 11:
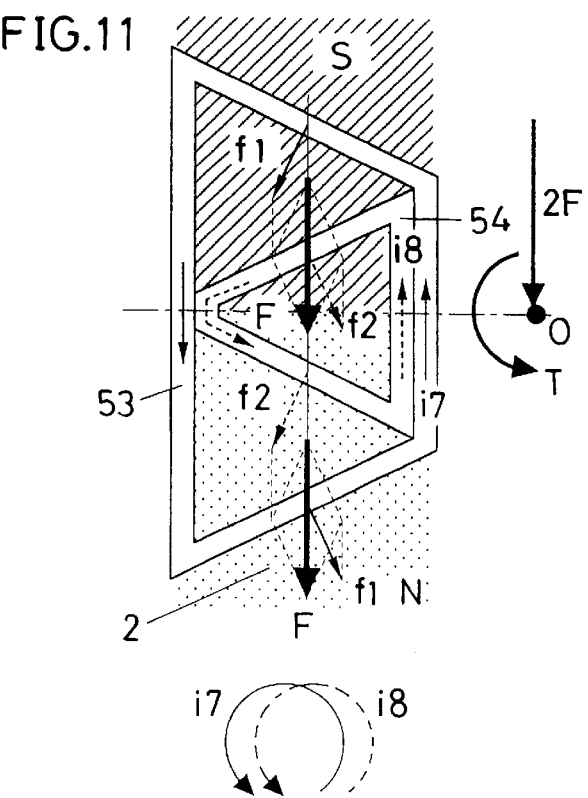
FIG. 11 shows a further operation according to the third embodiment of the present invention.

On the other hand, FIG. 11 shows the operation performed when electric currents flow in the same directions i7 and i8. In this case, a larger torque T can be obtained than in the case when electric currents flow in the opposite directions between the large hollow coil 53 and the small hollow coil 54 as shown in FIG. 10, and a magnetic head can be quickly moved. Therefore, the optimum voice coil motor can be realized for a seeking operation.

Thus, a magnetic head can be quickly moved with high positioning precision by selectively switching the combinations of the electric current flow directions by the current flow switch as shown in FIGS. 10 and 11 depending on the aspect of an operation.

As described above, according to the third embodiment of the present invention, in each of the aspects of operations such as the tracking operation, the seeking operation, etc., the combinations of electric current flow directions through two coils (the coils 51 and 52, and the large hollow coil 53 and the small hollow coil 54) can be selectively switched to drive the voice coil motor in the optimum operation for a target operation aspect, thereby more quickly positioning a magnetic head with higher precision than the conventional technology.

Embodiment 4

FIGS. 12 through 15 show a fourth embodiment of the present invention.

Figure 12:
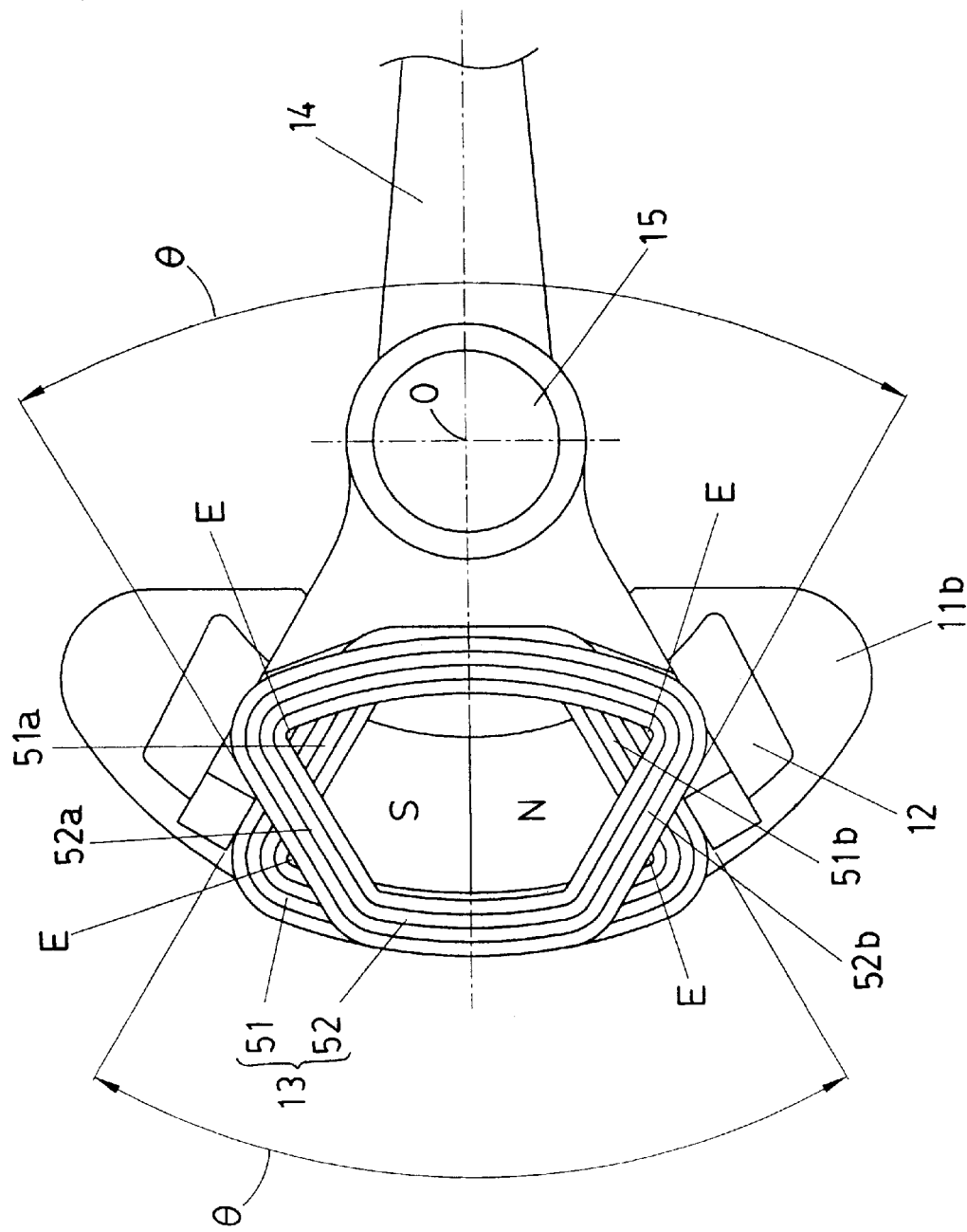
FIG. 12 is a plan view of the voice coil motor according to a fourth embodiment of the present invention.
Figure 13:
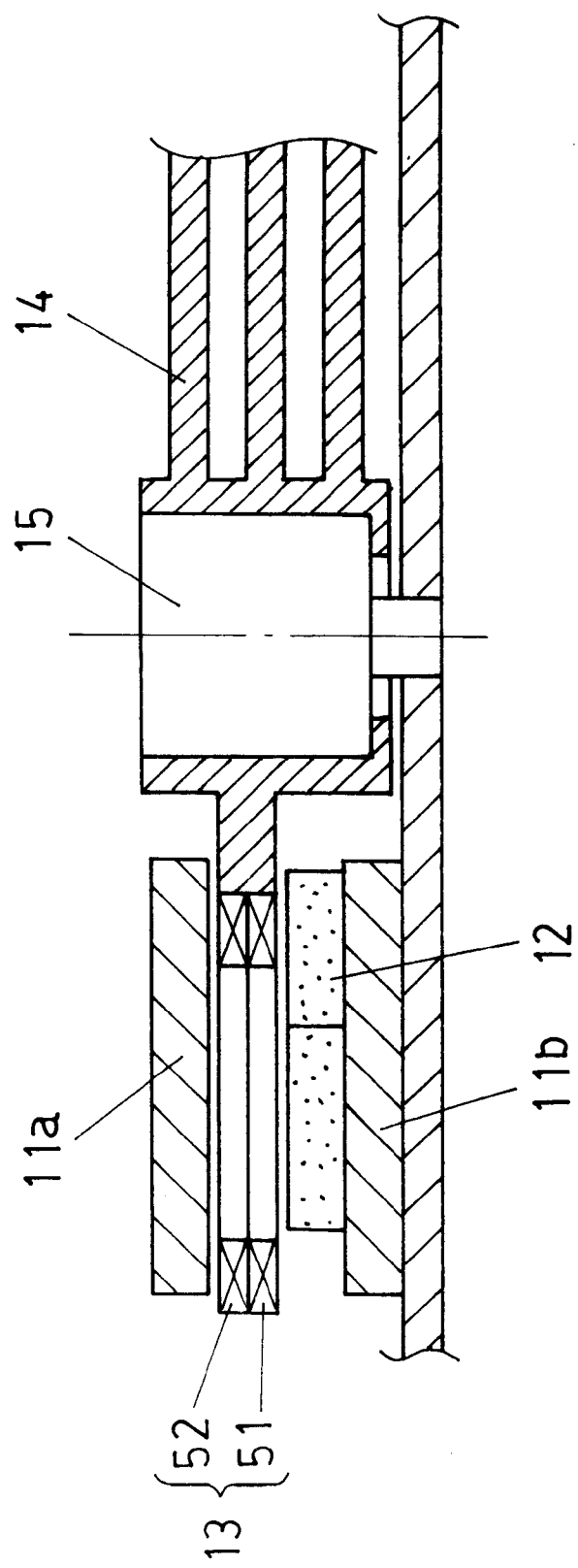
FIG. 13 is a sectional view of the voice coil motor according to the fourth embodiment of the present invention.

In FIGS. 12 and 13, the head carriage 14 is supported as rotatable around the central rotating axis O by the bearing 15. The movable coil 13 comprises a pair of the first hollow coil 51 and the second hollow coil 52. The first and second hollow coils 51 and 52 are layered along the axis of the bearing 15, and are collectively held by the head carriage 14.

Each of the angles O made by the radial sections 51a, 51b, 52a, and 52b generating the driving force for the first and second hollow coils 51 and 52 is 60 degrees. Above and below the movable coils 13, a pair of yokes 11a and yokes 11b are arranged with a predetermined space between the yokes and the movable coils 13. The permanent magnet 12 is fixed to the surface of the lower yoke 11b on the movable coils 13 side to form a magnetic circuit.

Figure 14:
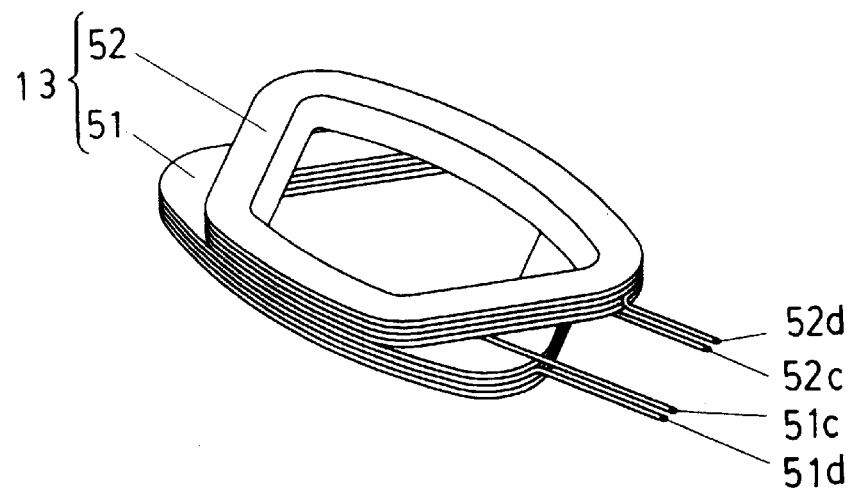
FIG. 14 is an oblique view of the coil according to the fourth embodiment of the present invention.

FIG. 14 is an oblique view of the layered movable coils 13. The first and second hollow coil 51 and 52 have the same shapes, and are also the same as each other in not only plan view and thickness, but also in position and length of leader line elements. The leader line elements are normally led out from inner and outer sides (51c and 52c, and 51d and 52d in FIG. 14), and connected to the driving circuit not shown in the attached drawings. The thicknesses of the first and second hollow coils 51 and 52 are partially increased by the diameters of the leader line elements 51c and 52c led out from the inner sides of the coil.

In FIG. 14, the leader line elements 51c, 51d, 52c, and 52d are formed in a predetermined area of the radial section. The first and second hollow coils 51 and 52 are layered with the sides, from which the leader line elements 51c and 52c led out from the inner sides are formed, facing the same direction.

In the second hollow coil 52, the leader line element 52c led out from the inner side of the coil is provided on the lower surface while, in the first hollow coil 51, the leader line element 51c led out from the inner side of the coil is provided on the upper surface. The leader line elements 51c and 52c can be led out from the space E (refer to FIG. 12) between the layered first and second hollow coils 51 and 52, thereby avoiding the increase of the total thickness of the movable coils 13.

The operation of the voice coil motor with the above-described configuration will be described by referring to FIGS. 15 and 16.

Figure 15:
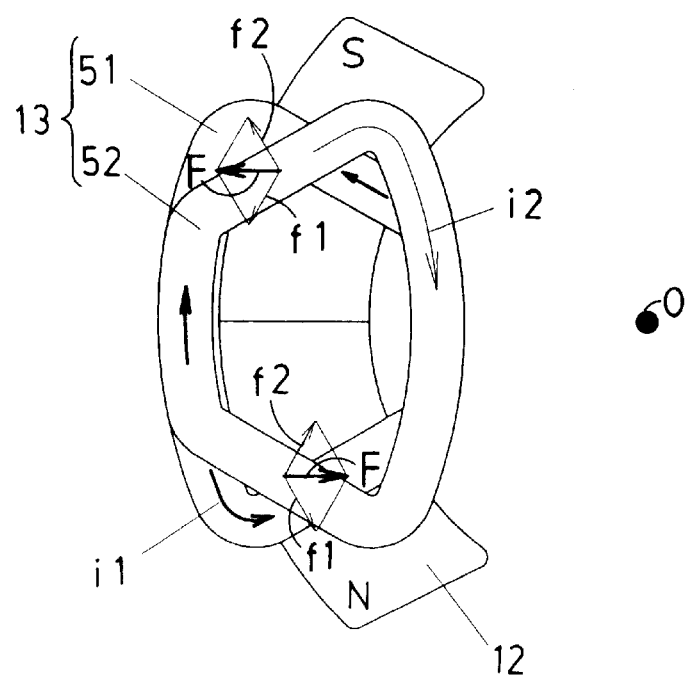

The N and S shown in FIG. 15 are magnetic poles of the permanent magnet 12. The arrows i1 and i2 denote the directions of the electric currents flowing through the first and second hollow coils 51 and 52. The arrows f1 and f2 denote the driving force generated respectively in the first and second hollow coils 51 and 52. The arrow F denotes resultant force of the arrows f1 and f2. The O denotes the rotation center of the bearing 15. FIG. 16 is a typical view showing the entire operation. The arrow T denotes the torque generated around the bearing 15.

When electric currents flow through the first hollow coil 51 in the arrow i1 direction and through the second hollow coil 52 in the arrow i2 direction, the magnetic field generated by the magnetic circuit formed by the permanent magnet 12 and the yokes 11a and 11b generates the driving force f1 in the radial sections 51a and 51b of the first hollow coil 51, and the driving force f2 in the radial sections 52a and 52b of the second hollow coil 52 respectively, to the direction of an arrow shown in FIG. 15. In the entire movable coils 13, the resultant force F of the driving force f1 and f2 is generated in each of the radial sections of the movable coils 13.

As shown in FIG. 16, the resultant force F generated in each of the radial sections of the movable coils 13 is a couple of forces in the direction vertical to the movement direction C of the magnetic head 16 mounted to the end of the head carriage 14. Therefore, only the torque T is generated around the rotation center O at the bearing 15, and no radial load is generated. As a result, the bearing 15 and the head carriage 14 do not vibrate, thereby improving the positioning precision of a magnetic head.

As described above, according to the present embodiment, the layered coils are of a same shape and the leader line elements of the coils are led out from a predetermined area in the radial sections, and the sides of the layered coils from which leader line elements are led out are set to oppose to each other, thereby obtaining the coils of the identical shape including the configuration of the leader line elements. That is, since the specification of the coils is limited to one type, the production facilities (wiring unit, etc.) can be shared in producing coils. In addition, the number of management items such as material management, quality management, etc. can be reduced. Therefore, the productivity can be improved, and the cost can be reduced.

Embodiment 5

FIGS. 17 and 18 show a fifth embodiment of the present invention.

In FIGS. 17 and 18, the head carriage 14, the bearing 15, the yokes 11a and 11b, and the permanent magnet 12 are the same as those in the configuration shown in FIG. 12. The difference from the configuration shown in FIG. 12 is that the shortest distance from the rotation center O to the first hollow coil 51, configuring a movable coil 13, is different from that to the second hollow coil 52.

Practically, in FIG. 17, the first and second hollow coils 51 and 52 are mounted such that the shortest distance L2 from the rotation center O to the second hollow coil 52 can be shorter than the shortest distance L1 from the rotation center O to the first hollow coil 51.

The operations of the voice coil motor with the above-described configuration will be described below.

Since the basic operation principle is the same as that of the fourth embodiment, the description is given by referring to FIG. 15.

By the electric currents flowing through the first and second hollow coils 51 and 52, the magnetic field generated by the magnetic circuit formed by the permanent magnet 12 and the yoke 11 generates the driving force f1 in the radial sections 51a and 51b of the first hollow coil 51, and the driving force f2 in the radial sections 52a and 52b of the second hollow coil 52, respectively. In the entire movable coils 13, the resultant force F of the driving force f1 and f2 is generated in each of the radial sections of the movable coils 13, and a tracking operation of a magnetic head (not shown in the attached drawings) is performed.

As shown in FIG. 17, since the movable coils 13 are arranged such that the shortest distance L2 from the rotation center O to the second hollow coil 52 can be shorter than the shortest distance L1 from the rotation center O to the first hollow coil 51, the line element sections (J sections) interconnecting the radial sections on the rotation center side of the second hollow coil 52 is not set opposite the permanent magnet 12, thereby reducing the amount of magnetic fluxes interlinking at the J portion.

Therefore, the generation of force from the B portion of the second hollow coil 52 can be avoided, thereby reducing the vibratile force applied to the bearing 15. That is, the vibration of the bearing 15 or the head carriage 14 can be reduced, thereby improving the positioning precision of a magnetic head.

As described above, according to the present embodiment, the generation of force from the line element sections connecting the radial sections on the rotation center side of the second hollow coil can be avoided by setting the shortest distance from the rotation center O to the second hollow coil 52 shorter than the shortest distance from the rotation center O to the first hollow coil 51. Therefore, the vibratile force applied to the bearing can be reduced, thereby improving the positioning precision of a magnetic head.

Embodiment 6

FIGS. 19 and 20 show a sixth embodiment of the present invention.

In FIG. 19, the head carriage 14, the bearing 15, the yokes 11a and 11b, and the permanent magnet 12 are the same as those in the configuration shown in FIG. 17. The difference from the configuration shown in FIG. 17 is that the thicknesses in the axial direction of the first and second hollow coils 51 and 52 forming the movable coils 13 are different from each other.

In FIG. 19, the thickness of the second hollow coil 52 along the axis is set smaller than the thickness of the first hollow coil 51 along the axis. In addition, the number of rings of each coil is set such that the force generated in the radial section of the first hollow coil 51 can be equal to the force generated in the second hollow coil 52.

The operations of the voice coil motor with the above-described configuration will be described below.

Since the basic operation principle is the same as that of the fourth embodiment, the description is given by referring to FIG. 15.

By the electric currents flowing through the first and second hollow coils 51 and 52, the magnetic field generated by the magnetic circuit formed by the permanent magnet 12 and the yokes 11a, 11b generates the driving force f1 in the radial sections 51a and 51b of the first hollow coil 51, and the driving force f2 in the radial sections 52a and 52b of the second hollow coil 52. In the entire movable coils 13, the resultant force F of the driving force f1 and f2 is generated in each of the radial sections of the movable coils 13, and a tracking operation of a magnetic head (not shown in the attached drawings) is performed.

Figure 20A:
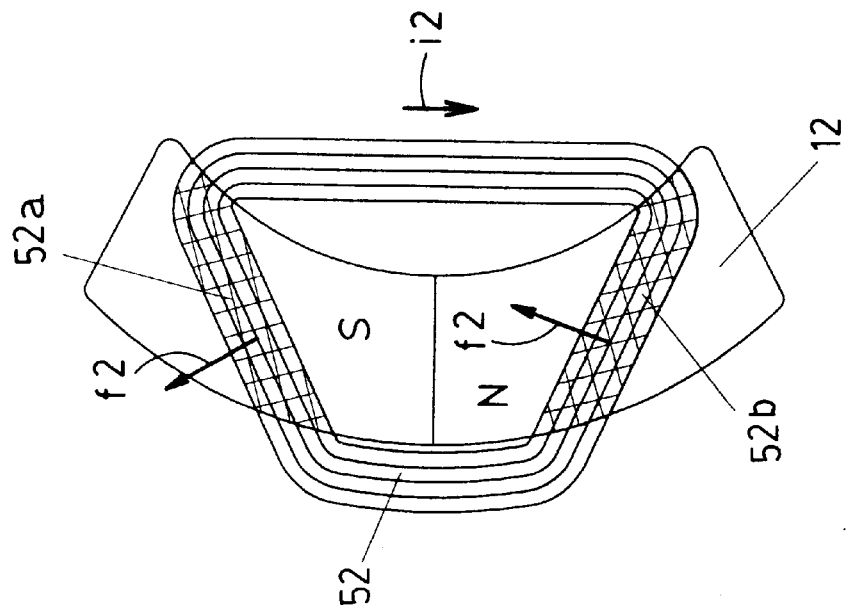
Figure 20B:
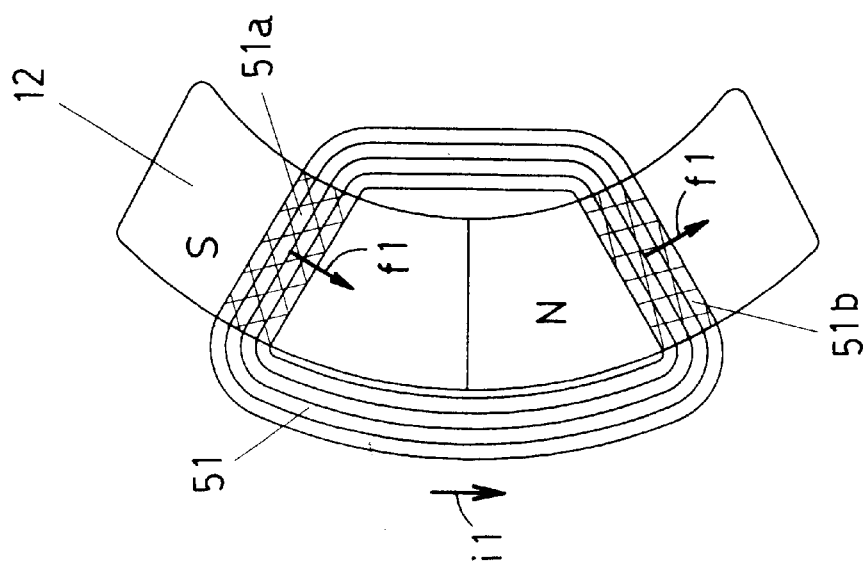

As shown in FIGS. 20a and 20b, the area of the second hollow coil 52 opposite to the permanent magnet 12 is larger than the area of the first hollow coil 51 opposite the permanent magnet 12 (in FIGS. 20a and 20b, the opposing areas of the radial sections 52a and 52b are larger than the opposing areas of the radial sections 51a and 51b). However, since the second hollow coil 52 has a predetermined number of rings of the coil with the thickness set smaller along the axis, the increase of the opposing area of the second hollow coil 52 opposite the permanent magnet 12 is offset by the decrease of the number of rings of the coil with the driving force f2 generated in the second hollow coil 52 being nearly equal to the driving force f1 generated in the first hollow coil 51.

Therefore, the resultant force F (not shown in the attached drawings) of the driving force f1 and the driving force f2 is a couple of forces around the bearing, and only a torque is generated around the rotation center O at the bearing 15 with no radial load generated. As a result, the bearing 15 and the head carriage 14 do not vibrate, thereby improving the positioning precision of a magnetic head.

As described above, according to the present embodiment, the thickness of the second hollow coil along the axis is set smaller than the thickness of the first hollow coil along the axis (the number of rings of the second hollow coil having a larger amount of interlinking magnetic fluxes than the first hollow coil is reduced). As a result, the driving force f1 and f2 generated from the first hollow coil and the second hollow coil are equal to each other, and the resultant force can be a couple of forces only in the direction vertical to the movement direction of a magnetic head. Therefore, a voice coil motor which can position a magnetic head with high precision without an influence of a radial load on the bearing can be obtained.

Furthermore, since the total thickness of the coils can be smaller along the axis, a smaller and thinner system can be realized. In addition, the space of a magnetic circuit formed by a permanent magnet and yokes can be small with a small reluctance. Accordingly, the magnetic flux interlinking the coil can be increased, thereby realizing a highly efficient voice coil motor.

Embodiment 7

FIG. 21 shows a fourth embodiment of the present invention.

In FIG. 21, the head carriage 14, the bearing 15, the yokes 11a and 11b, and the permanent magnet 12 are the same as those in the configurations shown in FIGS. 17 and 19. The difference from the configurations shown in FIGS. 17 and 19 is that the shapes of the line element sections on the rotation center side for connecting the radial sections of the first and second hollow coils 51 and 52 forming the movable coils 13 are different from each other.

In FIG. 21, the line element sections on the rotation center side for connection of the radial sections 52a and 52b of the second hollow coil 52 are formed as substantially concentric with the rotation center 0. Since the line element sections are concave for the hollow portion, they are formed normally after the wiring process.

The operations of the voice coil motor with the above-described configuration will be described below.

Since the basic operation principle is the same as that of the fourth embodiment, the description is given by referring to FIG. 15.

By the electric currents flowing through the first and second hollow coils 51 and 52, the magnetic field generated by the magnetic circuit formed by the permanent magnet 12 and the yokes 11a, 11b generates the driving force f1 in the radial sections 51a and 51b of the first hollow coil 51, and the driving force f2 in the radial sections 52a and 52b of the second hollow coil 52.

In the entire movable coils 13, the resultant force F of the driving force f1 and f2 is generated in each of the radial sections of the movable coils 13, and a tracking operation of a magnetic head (not shown in the attached drawings) is performed.

Furthermore, the arrangement position of the second hollow coil 52 much affects the area occupied by a voice coil motor. As shown in FIG. 21, the line element sections on the rotation center side for connecting the radial sections 52a and 52b of the second hollow coil 52 are formed as substantially concentric with the rotation center O, the second hollow coil 52 can be arranged closer to the bearing 15.

Therefore, since the first hollow coil 51, the permanent magnet 12, and the yokes 11a and 11b can be arranged close to the bearing 15, the L3 dimension can be short and a small voice coil motor can be realized.

As described above, according to the present embodiment, the line element sections on the rotation center side for connecting the radial sections 52a and 52b of the second hollow coil 52 are formed as substantially concentric with the rotation center O, not only the second hollow coil 52, but also the important units of the voice coil motor (the first hollow coil 51, the permanent magnet 12, the yokes 11a and 11b, etc.) can be arranged closer to the bearing 15.

Therefore, the area occupied by the voice coil motor can be reduced, thereby realizing a small voice coil motor.

Embodiment 8

FIGS. 22 through 24 show a fifth embodiment of the present invention.

In FIG. 22, the head carriage 14, the bearing 15, the yokes 11a and 11b, and the permanent magnet 12 are the same as those in the configurations shown in FIGS. 17 and 19. The difference from the configurations shown in FIGS. 17 and 19 is that a predetermined area of the radial section which is an opposing area of the layered first and second hollow coils 51 and 52 is compressed along the axis, and is plasticized.

In FIGS. 23 and 24, the predetermined areas of the opposing radial sections 51a, 51b, 52a, and 52b are plasticized, and each of their thicknesses along the axis are locally thin. Incidentally, the plasticization is preprocessed normally in a pressing process, etc. To facilitate the process, the coil material in configured with aluminum. Furthermore, since the predetermined areas of the radial sections 51a, 51b, 52a, and 52b facing each other are plasticized, the total thickness of the layers are designed to be thin for each of the thicknesses of the first and second hollow coils 51 and 52.

The operations of the voice coil motor with the above-described configuration will be described below.

Since the basic operation principle is the same as that of the fourth embodiment, the description is given by referring to FIG. 15.

By the electric currents flowing through the first and second hollow coils 51 and 52, the magnetic field generated by the magnetic circuit formed by the permanent magnet 12 and the yoke 11 generates the driving force f1 in the radial sections 51a and 51b of the first hollow coil 51, and the driving force f2 in the radial sections 52a and 52b of the second hollow coil 52. In the entire movable coils 13, the resultant force F of the driving force f1 and f2 is generated in each of the radial sections of the movable coils 13, and a tracking operation of a magnetic head (not shown in the attached drawings) is performed.

As described above, according to the present embodiment, a predetermined area of at least one of the layered coils is compressed and plasticized along the rotating axis so that, with the configuration, the total thickness of the layers can be reduced in comparison with the thickness of each coil.

Therefore, a thin voice coil motor can be realized. In addition, the distance of the magnetic circuit formed by the permanent magnet and the yokes can be shorter with the reluctance made smaller, and the magnetic fluxes interlinking the coil made larger, thereby realizing a highly efficient voice coil motor.

According to the present embodiment, coils are layered after preliminarily forming the first and second hollow coils 51 and 52. However, the present invention is not limited to this configuration, and the coils can be compressed and plasticized at the same time when the first and second hollow coils 51 and 52 are layered and fixed. That is, the procedure of the assembly process is optional (not shown in the attached drawings).

In addition, according to the present embodiment, a predetermined area of the opposing radial sections 51a, 51b, 52a, and 52b of the first and second hollow coils 51 and 52 is plasticized. However, the entire area of the sides of the first and second hollow coils 51 and 52 may be plasticized (not shown in the attached drawings). Furthermore, according to the present embodiment, the coil material is configured with aluminum, however, it may be other than aluminum, such as, common copper, etc.

What is claimed is:

1. A voice coil motor comprising:

a pair of yokes opposite to each other having a predetermined space defined between said yokes;

a permanent magnet fixed to at least one of said yokes in the space between said yokes; and at least a pair of coils mounted on a rotating member which is rotatable around a predetermined rotating axis, and providing in a magnetic space formed by said permanent magnet and said yokes, said pair of coils each having radial sections contributing to generating only a torque about said rotating member, wherein said coils are layered along the central rotating axis in such a manner that said radial sections of each coil define an open angle, said open angles being equal and having a common center line, said open angles being open in opposite directions so that a resultant force generated in the radial sections of said coils can be a couple of forces in a direction vertical to a movement direction of the rotating member when an electric current flows in a predetermined direction through each coil.

2. A voice coil motor comprising:

a pair of yokes opposite to each other having a predetermined space defined between said yokes;

a permanent magnet fixed to at least one of said yokes in the space between said yokes; and at least a pair of coils mounted on a rotating member which is rotatable around a predetermined rotating axis, and provided in a magnetic space formed by said permanent magnet and said yokes, said pair of coils each having radial sections contributing to generate only a torque about said rotating member, wherein said coils are layered in such a manner that said radial sections of each coil define an open angle, said open angles being equal and having a common center line, said open angles being open in opposite directions so that a resultant force of the radial sections of said coils can be a couple of forces in a direction vertical to a movement direction of the rotating member when an electric current flows in a predetermined direction through each coil, and wherein said pair of coils are different from one another in size, and at least one coil which is larger than any of the other coils has a hollow to accommodate therein a smaller coil.

3. A voice coil motor comprising:

a pair of yokes opposite to each other having a predetermined space defined between said yokes;

a permanent magnet fixed to at least one of said yokes in the space between said yokes; and at least a pair of coils mounted on a rotating member which is rotatable around a predetermined rotating axis, and provided in a magnetic space formed by said permanent magnet and said yokes, said pair of coils each having radial sections contributing to generate only a torque about said rotating member, wherein said coils are arranged in such a manner that said radial sections of each coil define an open angle, said open angles being equal and having a common center line, said open angles being open in opposite directions so that a current flow direction switch for selectively switching a combination of directions in which current flows through the coils is connected to at least one of the coils.

4. A voice coil motor comprising:

a pair of yokes opposite to each other along a rotating support axis, with a space defined between said yokes;

a permanent magnet fixed to at least one of said yokes in the space between said yokes; and at least a pair of movable coils provided to be rotatable in a magnetic space formed by said permanent magnet and said yokes, and each of said pair of coils having radial sections contributing to generate only a torque, said radial sections of each coil defining an open angle, said open angles being equal and having a common center line, said open angles being open in opposite directions, wherein said movable coils are of a same shape, and are layered one on top of the other along the axis.

5. The voice coil motor according to claim 4, wherein leader line elements of the movable coils are formed in a predetermined area of the radial sections and said movable coils are layered with end faces thereof from which leader line elements are led opposite to each other.

6. A voice coil motor comprising:

a pair of yokes opposite to each other along a rotating support axis, with a space defined between said yokes;

a permanent magnet fixed to at least one of said yokes in the space between said yokes; and a first hollow coil and a second hollow coil layered one on top of the other along the axis to be rotatable in a magnetic space formed by said permanent magnet and said yokes, wherein radial sections contributing to generate only a torque in the first hollow coil radially extend from a rotation center, while radial sections contributing to generate only a torque in the second hollow coil extend at an angle different in direction from the radial sections of said first hollow coil, said radial sections of each coil defining an open angle, said open angles having a common center line, wherein a shortest distance from said rotation center to the second hollow coil is shorter than a shortest distance from the rotation center to the first hollow coil.

7. A voice coil motor comprising:

a pair of yokes opposite to each other along a rotating support axis, with a space defined between said yokes;

a permanent magnet fixed to at least one of said yokes in the space between said yokes; and a first hollow coil and a second hollow coil layered one on top of the other along the axis to be rotatable in a magnetic space formed by said permanent magnet and said yokes, wherein radial sections contributing to generate a torque in the first hollow coil radially extend from a rotation center, while radial sections contributing to generate a torque in the second hollow coil extend at an angle different in direction from the radial sections of the first hollow coil, and wherein a thickness of the second hollow coil along the axis is smaller than a thickness of the first hollow coil along the axis.

8. A voice coil motor comprising:

a pair of yokes opposite to each other along a rotating support axis, with a space defined between said yokes;

a permanent magnet fixed to at least one of said yokes in the space between said yokes; and at least a pair of movable coils provided to be rotatable in a magnetic space formed by said permanent magnet and said yokes, and having radial sections contributing to generate only a torque, said radial sections of each coil defining an open angle, said open angles being equal and having a common center line, said open angles being open in opposite directions, wherein said movable coils are layered one on top of the other along the axis, and at least one of the movable coils has line element sections formed substantially concentric with a rotation center, said sections connecting the radial sections on the rotation center side.

9. A voice coil motor comprising:

a pair of yokes opposite to each other along a rotating support axis, with a space defined between said yokes;

a permanent magnet fixed to at least one of said yokes in the space between said yokes; and at least a pair of movable coils provided to be rotatable in a magnetic space formed by said permanent magnet and said yokes, and having radial sections contributing to generate only a torque, said radial sections of each coil defining an open angle, said open angles being equal and having a common center line, said open angles being open in opposite directions, wherein said movable coils are layered one on top of the other along the axis, and a predetermined area of at least one of said layered movable coils is compressed and plasticized along the rotating axis.

10. The voice coil motor according to claim 9, wherein the coils are formed of a material containing aluminum.

11. A voice coil motor as defined in claim 1, wherein said coils have a trapezoidal or triangular configuration.

* * * * *